United States Patent
Kasahara

(10) Patent No.: US 6,767,600 B1
(45) Date of Patent: Jul. 27, 2004

(54) LAMINATE WITH GAS BARRIER PROPERTIES, PRODUCTION METHOD THEREFOR, AND PAPER CONTAINER EMPLOYING SAID LAMINATE

(75) Inventor: Hiroshi Kasahara, Kawasaki (JP)

(73) Assignee: Japan Polyolefins Co., Ltd., Tokyo (JP)

(*) Notice: Subject to any disclaimer, the term of this patent is extended or adjusted under 35 U.S.C. 154(b) by 0 days.

(21) Appl. No.: 09/744,438

(22) PCT Filed: Jul. 22, 1999

(86) PCT No.: PCT/JP99/03925
§ 371 (c)(1),
(2), (4) Date: Jan. 24, 2001

(87) PCT Pub. No.: WO00/05069
PCT Pub. Date: Feb. 3, 2000

(30) Foreign Application Priority Data

Jul. 24, 1998 (JP) .......... 10-210080
Jul. 24, 1998 (JP) .......... 10-210081

(51) Int. Cl.$^7$ .......... B27M 3/00; B29D 22/00; B29D 23/00; B32B 1/08; B27N 5/02
(52) U.S. Cl. .......... 428/35.6; 428/35.7; 428/36.6; 428/36.7; 428/35.4; 428/507
(58) Field of Search .......... 428/35.6, 35.7, 428/36.6, 36.7, 36.9, 36.91, 36.92, 35.4, 500, 507

(56) References Cited

U.S. PATENT DOCUMENTS 5,732,825 A * 3/1998 Ikenoya et al. .......... 206/484

FOREIGN PATENT DOCUMENTS

| CN | 1132775 A | 10/1996 | .......... C09J/123/00 |
|----|-----------|---------|------------------------|
| EP | 0 721 975 | 7/1996 | .......... C09J/123/08 |
| EP | 0 721 975 A1 * | 7/1996 | .......... C09J/123/08 |
| EP | 0 763 423 A1 * | 3/1997 | .......... B32B/27/36 |
| JP | 57-157724 | 9/1982 | |
| JP | 59-75915 | 4/1984 | |
| JP | 5-162737 | 6/1993 | .......... B65D/5/56 |
| JP | 5-213337 | 8/1993 | .......... B65D/5/56 |
| JP | 8-188679 | 7/1996 | .......... C08L/23/00 |
| JP | 8-193148 | 7/1996 | .......... C08L/23/00 |
| JP | 8-252890 | 10/1996 | |
| JP | 8-258225 | 10/1996 | |
| JP | 8-258234 | 10/1996 | |
| JP | 9-66587 | 3/1997 | |
| JP | 9-076419 | 3/1997 | |
| JP | 9-327888 | 12/1997 | .......... B32B/27/00 |
| JP | 10-87910 | 4/1998 | .......... C08L/23/04 |
| JP | 10-087910 | 4/1998 | |
| JP | 10-264342 | 10/1998 | |
| WO | 95/03939 | * 2/1995 | .......... B32B/27/30 |

* cited by examiner

Primary Examiner—Harold Pyon
Assistant Examiner—Michael C. Miggins
(74) Attorney, Agent, or Firm—Sughrue Mion, PLLC

(57) ABSTRACT

A paper container is produced that has gas barrier properties, by employing a laminate having at least a (I) paper layer 101, a (II) gas barrier layer 103, and an (III) epoxy-group-containing resin composition layer 104. The (III) epoxy-group-containing resin composition layer consists of a resin composition that contains a polyolefin (a) having a melt flow rate of 0.1~100 g/min and an epoxy-compound (b) which has two or more epoxy groups in the molecule and has a molecular weight of 3000 or less, epoxy-compound (b) being added in an amount of 0.01~5 parts by weight with respect to 100 parts by weight of polyolefin (a). This (III) epoxy-group-containing resin composition layer has good adhesion with the (II) gas barrier layer, thus a laminate can be produced without employing a dry laminate adhesive agent or an extrusion laminate anchor agent. Accordingly, it is possible to avoid a deterioration in the work environment or an odor remaining in the final product from the use of organic solvents. As a result, a paper container having a good adhesive strength between the layers and superior gas barrier properties can be obtained.

5 Claims, 5 Drawing Sheets

LAMINATE WITH GAS BARRIER PROPERTIES, PRODUCTION METHOD THEREFOR, AND PAPER CONTAINER EMPLOYING SAID LAMINATE

TECHNICAL FIELD

The present invention relates to a laminate with superior gas barrier properties, a production method therefor, and a paper container employing this laminate. More specifically, the present invention relates to a laminate with gas barrier properties that can be produced without using an organic solvent, this laminate being excellent for long-term storage, non-refrigerated transport, and aseptic packaging applications due to its superior capacity to act as an oxygen barrier. The present invention further relates to a production method for this laminate, and to a paper container employing this laminate.

This application is based on patent applications filed in Japan (Japanese Patent Application Nos. Hei 10-210080 and Hei 10-210081), the contents of which are incorporated herein by reference.

PRIOR ART

In general, a laminate having a three-layer structure consisting of polyethylene/paper board/polyethylene is employed for the laminate used in paper containers and the like for packaging liquids (polyethylene will be abbreviated as "PE" hereinafter). (Note that "PE/paper board/PE" as employed in this specification indicates that PE, paper board and PE have been laminated together in this order). A laminate of this design is formed into a box-shaped, sealed container by making use of the high rigidity of paper board and the heat sealing properties of the PE which is disposed to the outer and inner surfaces of the paper board. Containers of this design are widely used as 200 ml to 2 liter milk cartons, or as containers for refreshments or alcoholic beverages. As compared to a metal or glass container, however, containers consisting of this type of laminate using paper board and PE permit more oxygen to permeate through the container. Thus, in cases where the quality of the contents within the container could be affected by oxidation, these containers are disadvantageous in that they require chilled transport and only permit storage for a short period of time.

When a container is to be filled with sterile contents or to be transported at room temperature, a packaging material which allows minimal deterioration in contents must be employed. In this case, a paper container consisting of a laminate that has gas barrier properties is required. In addition, depending on the material held, a container may be required to retain the odor of the contents. From this perspective as well, a paper container that has gas barrier properties is needed.

Paper thinner than the paper board used for packaging liquids is employed in the case of paper containers for holding dry food products, medicines or the like. Namely, a two-layer laminated paper consisting of paper and PE layers is employed. Characteristically, a container employing this type of laminated paper is easily torn by hand, provided that the paper has some stiffness and is thin. As in the case of a paper container for packaging liquids, this type of paper container may also be required to have a gas barrier function according to its application.

Laminating aluminum foil ("Al foil" hereinafter) is a frequently employed approach for providing gas barrier properties to a paper container. In this case, when taking into consideration adhesiveness between layers and the heat sealing ability of the inner layer of the container, a PE/paper/PE/Al foil/ethylene-methacrylic acid copolymer ("EMAA" hereinafter)/PE structure, or a PE/paper/PE/Al foil/PE structure is used.

A container for holding an alcoholic beverage, for example, must have gas barrier properties, a heat-sealing capability on either surface, and have sufficient impact-resistance to prevent damage to the container if dropped. In this case, a PE/paper/PE/Al foil/PET/PE structure may be employed in which the Al foil is used as the gas barrier layer and polyethylene terephthalate ("PET" hereinafter) is used as the impact-resistant resin layer.

A dry laminating method, extrusion laminating method, or the like may be suitably selected as the method employed to produce a laminate having Al foil in this way. Alternatively, depending on the structure of the laminate, both methods may be employed together.

In a dry laminating method, an adhesive agent such as isocyanate is dissolved in organic solvent, and the liquid material resulting is coated to one side of a base material. The solvent is evaporated in a dryer and respective base materials are adhered together using a nip roller. This method requires using a large amount of expensive adhesive agent, and thus increases production costs. In addition, the use of organic solvents has a negative impact on the work environment and results in an unpleasant odor remaining in the final product.

In contrast, the extrusion laminating method does not require an adhesive agent when adhering together the PE and the paper. However, when laminating together PE and a base material consisting of a film, such as PET film, or when laminating together PE and a base material consisting of a metal foil such as Al foil, the usual method is one in which an isocyanate or similar type adhesive agent referred to as an anchor coat agent ("AC" hereinafter) is coated in advance onto the base material in order to increase adhesion. A resin is then melt extruded onto this coated layer. However, this method not only has higher production costs as was the case of the dry laminating method above, but there is also a deterioration in the work environment due to the use of organic solvents. This method is further problematic in that an odor remains in the final product.

In order to resolve these problems, methods have been proposed which do not employ an AC agent derived from organic solvents, or which employ an aqueous AC agent derived from polyethyleneimine.

However, aqueous AC agents have the disadvantage of inferior water resistance due to the adhesive agent's intrinsic aqueous solubility.

As approaches which do not employ an AC agent, methods have been proposed in which a polar group, such as a carboxyl group or acid anhydride group, is introduced into polyolefin. Examples of this approach include the methods disclosed in Japanese Patent Application, First Publication No. (A) Sho 57-157724 (WPI Acc No. 82-95762E); Japanese Patent Application First Publication No. (A) Sho 59-75915 (WPI Acc No. 84-143564); Japanese Patent Application First Publication No. (A) Hei 8-252890 (WPI Acc No. 96-492986); Japanese Patent Application First Publication No. (A) Hei 8-258225 (WPI Acc No. 96-501588); Japanese Patent Application First Publication No. (A) Hei 8-258234 (WPI Acc No. 96-501597); Japanese Patent Application First Publication No. (A) Hei 9-66587 (WPI Acc No. 97-221082); Japanese Patent Application First Publication No. (A) Hei9-76419 (WPI Acc No. 97-240491); Japanese Patent Application First Publication No. (A) Hei 10-264342 (WPI Acc No. 98-588752), and the like. While there is an increase in the adhesive strength of the laminate obtained using these methods as compared to a laminate formed using polyolefin alone, this adhesive strength is not adequate when compared to the case where an AC agent is used.

In addition, productivity is poor with methods employing dry laminate adhesive agents or extrusion laminate AC agents, making these approaches problematic as well.

For example, when producing the laminate employed in the aforementioned alcoholic beverage container, dry laminating is performed one time in order to laminate the Al foil and PET, tandem extrusion laminating and single extrusion laminating are performed one time in order to laminate the PE, and a urethane AC agent is required to laminate the PET and PE.

In other words, in order to produce a laminate of a structure consisting of Al foil and PET, a dry laminate adhesive agent and an extrusion laminate AC agent are necessary. As a result, production costs increase, a considerable amount of organic solvent is used, and there are numerous steps involved to make the laminate. For example, in the aforementioned alcoholic beverage container, dry laminating is performed one time, tandem extrusion laminating is carried out one time, and single extrusion laminating is carried out one time. In other words, laminating is performed three times. Further, since time is required to cure (aging time) the adhesive agent, productivity is poor. With respect to a laminate and production method therefore which does not employ an anchor coat agent, the present inventors have already proposed the methods disclosed in Japanese Patent Application, First Publication No. (A) Hei 8-188679 (WPI Acc No. 96-322827); Japanese Patent Application, First Publication No. (A) Hei 8-193148 (WPI Acc No. 96-322827); and Japanese Patent Application, First Publication No. (A) Hei 10-87910 (WPI Acc No. 98-267240). This invention is one of the applied patents of these inventions.

In other words, it is the objective of the present invention to provide a laminate which can be produced without using a dry laminate adhesive agent or an extrusion laminate AC agent, in a small number of steps, with good productivity, this laminate having excellent gas barrier properties and odor retention. It addition, it is also the objective of the present invention to provide a production method for this laminate, and to provide a paper container employing this laminate.

DISCLOSURE OF THE INVENTION

The present inventors discovered that a resin composition containing epoxy group ("epoxy-group-containing resin composition" hereinafter), in which a specific compound bearing an epoxy group has been mixed with a polyolefin derived resin, can be employed to adhere layers where a dry laminate adhesive agent or an extrusion laminate AC agent had been required conventionally. The present inventors learned that by means of this approach, it was possible to obtain a high adhesive strength without using an adhesive agent, to eliminate the need for time to cure (aging time) the adhesive agent during the production process, to improve production efficiency, and to achieve a reduction in the number of production steps. In addition, in the present invention, contamination of the work environment by organic solvents when producing the laminate is not an issue. Further, since the laminate has a gas barrier layer, by employing this laminate in a paper container or the like, it is possible to provide a container in which the quality of the contents therein is not affected by oxidation.

In other words, the present invention is a laminate with gas barrier properties having at least a (I) paper layer; a (II) gas barrier layer; and an (III) epoxy-group-containing resin composition layer, which includes 100 parts by weight of polyolefin (a) and 0.01~5 parts by weight of epoxy compound (b) which has two or more epoxy groups in the molecule and has a molecular weight of 3000 or less; wherein the (II) gas barrier layer is in contact with the (III) epoxy-group-containing resin composition layer. The present invention further concerns the production method for the aforementioned laminate and a paper container employing this laminate. In addition, in an other embodiment of a laminate with gas barrier properties, the (III) epoxy-group-containing resin composition layer consists of an epoxy-group-containing resin composition layer containing an olefin polymer(c) having a functional group that can react with the epoxy group in the amount of 30 weight percent or less of the epoxy-group-containing resin composition.

PREFERRED EMBODIMENTS OF THE PRESENT INVENTION

Figure 1:
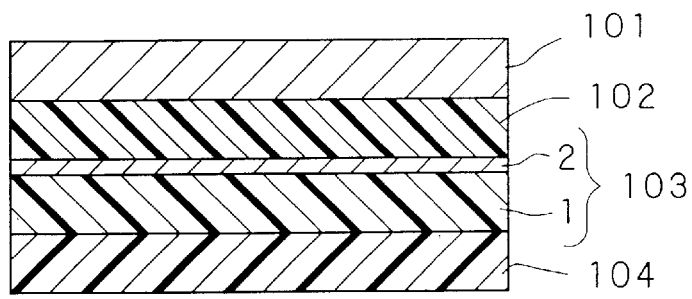
FIG. 1 is a cross-sectional diagram showing a laminate according to a first embodiment of the present invention.

The present invention will now be explained in greater detail.

(I) Paper Layer

In the present invention, it is desirable to employ as the (I) paper layer, a paper material having a weight in the range of $10 \text{ g/m}^2 \sim 500 \text{ g/m}^2$. For example, when rigidity is required of a container, as in the case of a container for a liquid, then, in general, the material referred to as "paper board" which has a weight in the range of $100 \text{ g/m}^2 \sim 500 \text{ g/m}^2$ is suitable. On the other hand, when the container must be easy to cut open, as in the case of a container for dry food products or medicinal products, then a material having a weight in the range of $10 \text{ g/m}^2 \sim 150 \text{ g/m}^2$ is suitably employed.

It is also acceptable to perform various pretreatments to the surface of the paper to improve adhesiveness, examples thereof including a corona discharge treatment, flame treatment, low-temperature plasma treatment, electron beam irradiation treatment, UV ray irradiation and the like. A corona discharge treatment is suitable from among these, because it is relatively simple and highly effective.

(II) Gas Barrier Layer

Examples of the (II) gas barrier layer employed in the present invention include synthetic resins such as polyester, polyamide ("PA" hereinafter), ethylene vinyl alcohol copolymer ("EVOH" hereinafter), polyvinylidene chloride, polyacrylonitrile, and polypropylene ("PP" hereinafter), as well as plastic films having low permeability such as oriented plastic films of the aforementioned synthetic resins or the like. Other examples include inorganic vapor deposited synthetic resin in which an inorganic material that has gas barrier properties is vapor deposited onto the aforementioned plastic films, or a metal foil through which oxygen or water vapor cannot pass.

Particularly preferable as the aforementioned inorganic vapor deposited synthetic resin layer is an arrangement in which an inorganic vapor deposited layer is formed on top of a polyester base material ("polyester layer" hereinafter) such as a PET film or the like, examples thereof including Al vapor deposited PET, oxidized Al vapor deposited PET, silica oxide vapor deposited PET, and the like.

Metal foils such as gold, silver, aluminum, nickel and the like may be cited as examples of the aforementioned metal foil, with Al foil being preferably employed.

In the present invention, the single layer plastic films, the synthetic resin layer of the inorganic vapor deposited synthetic resin layer, or the metal foil are each laminated so as to be adjacent to the (III) epoxy-group-containing resin composition layer. It is not necessary to specifically perform a surface treatment in order to achieve excellent adhesion between the (III) epoxy-group-containing resin composition layer, described below, and the synthetic resin layer of the inorganic vapor deposited synthetic resin layer or the single layer plastic film that form the (II) gas barrier layer. However, since improved adhesiveness can be realized by performing a surface treatment, it is more desirable to carry out one out in advance. Examples of surface treatments include a corona discharge treatment, flame treatment, UV irradiation treatment, electron beam irradiation treatment, or low-temperature plasma treatment. In addition, when even stronger adhesion is required, then it is further desirable to perform an in-line surface treatment during lamination.

(III) Epoxy-group-containing Resin Composition Layer

In the present invention, the (III) epoxy-group-containing resin composition layer-comprises a first resin composition that includes a polyolefin (a), and an epoxy-compound (b) containing two or more epoxy groups in the molecule and having a molecular weight of 3000 or less, wherein 0.01~5 parts by weight of epoxy-compound (b) is mixed with 100 parts by weight of polyolefin (a). Alternatively, the (III) epoxy-group-containing resin composition comprises a second resin composition that contains polyolefin (a), epoxy-compound (b), and an olefin polymer (c) that has a functional group that can react with epoxy group, wherein the amount of olefin polymer (c) is 30 wt % of the total weight of polyolefin (a) and an olefin poplymer (c), and 0.01~5parts by weight of the epoty-compound (b) component is mixed in with respect to a total 100 parts by weight of polyolefin (a) and an olefin polymer (a) Polyolefin Examples of the polyolefin (a) employed in the present invention include, for example, non-polar polyolefins such as propylene polymers, and polyethylene plastics such as high or medium density polyethylene ("HDPE" and "MDPE" hereinafter) having a density in the range of 0.94~0.97 g/cm$^3$; linear low density polyethylene ("LLDPE" hereinafter) having a density of less than 0.90~0.994 g/cm$^3$; very low density polyethylene ("VLDPE" hereinafter) having a density of less than 0.88~0.90 g/cm$^3$; or low density polyethylene ("LDPE" hereinafter) formed by a high pressure radical polymerization method.

The aforementioned HDPE, MDPE, and LLDPE are obtained by homopolymerizing ethylene using the catalysts generally referred to as Ziegler catalysts, Phillips catalysts, and Metallocene catalysts, or by copolymerizing ethylene and a 3–16C α-olefin. In general, these can be produced by either a low, medium, or high pressure method, or by a vapor phase method, solution method, or slurry method. Examples of propylene polymers include propylene homopolymer or copolymers, propylene-ethylene copolymer, or random or block copolymers with 4–16C α-olefin. In addition, examples of other polyolefins include 4–16C α-olefin homopolymers, copolymers of these (α-olefins and other α-olefin.

Of these, a low density polyethylene formed by a high pressure radical polymerization method is preferred from the perspective of low cost, general purpose use, and formability. When employing an LDPE, the MFR thereof is in the range of 0.1~100 g/10 minutes, preferably in the range of 0.1~50 g/10 minutes, and more preferably in the range of 0.1~20 g/10minutes. With in this range, melt tension has a suitable value and there is improved formability. In addition, density is in the range of 0.91~0.94 g/cm$^3$, and preferably in the range of 0.912~0.935 g/cm$^3$. Within this range, melt tension has a suitable value and formability is improved.

The MFR value employed in this specification is obtained according to JIS K6760 (ASTM D1238 E method 190° C./2.16 Kg load) for polyethylene, and according to JIS K6758 (ASTM D1238 L method 230° C./2.16 Kg load) for polypropylene.

The melt tension is in the range of 1.5~25 g, preferably 3~20 g, and more preferably 3~15 g. The molecular weight distribution (Mw/Mn, where Mw is the weight average molecular weight, and Mn is the number average molecular weight) is in the range of 3.0~12, and preferably 4.0~8.0. Melt tension is a measure of the elasticity of a resin. Formability is excellent provided that melt tension is within the aforementioned range. The LDPE satisfying these property can be obtained by polymerization in the presence of a free radical generating agent such as peroxide under a high atmospheric pressure of 1000~3500 atm., and is characterized in having numerous long chain branches. The LDPE is known to have superior extrusion properties due to the presence of these long chain branches, and is particularly suitable for use in extrusion laminating. An autoclave type or tubular type reaction vessel may be employed during polymerization.

Other examples of polyolefin (a) employed in this invention include a copolymer of ethylene and a monomer containing a polar group, such as an ethylene and vinyl ester copolymer, a copolymer of ethylene and α,β-unsaturated carboxylic acid or its derivatives, and the like.

The aforementioned ethylene-vinyl ester copolymer is a copolymer with a vinyl ester monomer such as vinyl propionate, vinyl acetate, vinyl capronate, vinyl caprylate, vinyl laurate, vinyl stearate, vinyl trifluoroacetate, and the like, which have ethylene as a main component and are produced using a high pressure radical polymerization method. Specifically, a copolymer consisting of 50~99.5 wt % of ethylene, 0.5~50 wt % of vinyl ester, and 0~49.5 wt % of another copolymerizable unsaturated monomer is preferred. In particular, the amount of vinyl ester contained is 3~30 wt %, and preferably 5~25 wt %. A desirable MFR for the ethylene vinyl ester copolymer is in the range of 0.1~50 g/10 min, and more preferably in the range of 0.3~30 g/10 min. Of the aforementioned, an ethylene-vinyl acetate copolymer ("EVA" hereinafter) is particularly preferred.

Examples of the copolymer between ethylene and $\alpha,\beta$-unsaturated carboxylic acid or its derivatives include ethylene-(meth)acrylate or its alkyl ester copolymers. The comonomers used for the copolymers include acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, glycidyl acrylate, glycidyl methacrylate, and the like. Of these, alkyl esters of (meth)acrylate using methyl, ethyl, or the like are preferred. In particular, the amount of (meth)acrylate is in the range of 3~30 wt %, and preferably 5~25 wt %. A desirable MFR for the copolymer between ethylene and the ($\alpha,\beta$-unsaturated carboxylic acid or its derivatives is in the range of 0.1~50 g/10 min, and more preferably in the range of 0.3~30 g/10 min.

Ethylene-(meth)acrylate copolymer (denoted "E(M)A" hereinafter), ethylene-maleic anhydride copolymer, ethylene-maleic anhydride-(meth)acrylate copolymer, ethylene-(meth)acrylate copolymer (denoted "E (M)AA" hereinafter), and metal salts thereof may be cited specifically.

Polyolefin (a) employed in the present invention may be suitably selected according to the objectives and applications. LDPE may be suitably employed from the perspective of forming and workability during extrusion laminating. In addition, LLDPE is convenient from the perspective of resistance to puncturing.

In particular, when considering adhesiveness between the metal foil and the gas barrier layer's inorganic vapor deposited layer, ethylene-maleic anhydride copolymer, ethylene-maleic anhydride-(meth)acrylate copolymer, E(M)AA and metal salts thereof are suitable. These synthetic resins may be used alone, or in combination with other synthetic resins.

(b) Epoxy-compounds

The epoxy-compound (b) employed in the present invention is a multivalent epoxy-compound that includes at least two or more epoxy groups (oxysilane groups) in the molecule, and has a molecular weight of 3000 or less. Epoxy-compound (b) must contain two or more epoxy groups in the molecule. When only one epoxy group is present in the molecule, a strong adhesion with the base material cannot be obtained. Epoxy-compound (b) must have a molecule weight of 3000 or less, with a molecular weight of 1500 or less being preferred. When the molecular weight exceeds 3000, it is not possible to achieve sufficient adhesive strength after formation into a composition.

Diglycidyl phthalate, diglycidyl isophthalate, diglycidyl terephthalate, diglycidyl adipate, trimethyloyl propane triglycidyl ether, polygylcerol polyglycidyl ether, pentaerythritol polyglycidyl ether, butane diol diglycidyl ether, hydrogenated bisphenol A digylycidyl ether, phenol novolak polyglycidyl ether, epoxidized vegetable oils, and the like are suitably employed as epoxy-compound (b). Of the aforementioned, epoxidized plant oils are particularly preferred from the perspective of handling and safety in case of using for packaging material for food products.

Epoxidized plant oils are formed by using peroxy acid for epoxidation of unsaturated double bonds in a natural plant oil. Examples thereof include epoxidized soybean oil, epoxidized linseed oil, epoxidized olive oil, epoxidized safflower oil, epoxidized corn oil, and the like. These epoxidized vegetable oils are commercially available as O-130P (epoxidized soybean oil) or O-180A (epoxidized linseed oil) manufactured by Asahi Denka Kogyo K.K.

The presence of oil components that were not epoxidized, or insufficiently epoxidized, that are generated as a byproduct in small amounts when epoxidation a vegetable oil, did not impair the effects of the present invention.

The amount of epoxy-compound (b) added is selected to be within the range of 0.01~5, preferably 0.01~1.0, and even more preferably 0.01~0.9, parts by weight with respect to 100 parts by weight of the polyolefin(a) component. When the amount of epoxy-compound (b) added is less than 0.01 parts by weight, then sufficient adhesion with the base material cannot be obtained. On the other hand, while adhesive strength is improved when the amount of epoxy-compound (b) exceeds 5 parts by weight, this is not desirable as problems arise such as the laminate causing blocking due to stickiness, or the generation of an odor.

The present invention's (III) epoxy-containing resin composition layer consists of a resin composition that includes an epoxy-compound (b) having two or more epoxy groups in the molecule and a molecular weight of 3000 or less, in which epoxy-compound (b) has been added in the amount of 0.01~5 parts by weight to 100 parts by weight of the polyolefin (a) component.

Epoxy-compound (b) employed in the present invention has been used conventionally as a plasticizer or stabilizer for such polymers as vinyl polychloride. Alternatively, a technique has been disclosed for using epoxy-compound (b) as a bridging agent by adding it to a resin that includes carboxylic acid group or carboxylic acid derivative groups in the molecule (Japanese Patent Application First Publication No. Sho 60-112815). However, the present inventors blended the epoxy-compound employed in these applications with a polyolefin that had no polarity, to form a composition. As a result, it was discovered that, in case that the composition is oxidized during a molding process, a very great improvement in the strength of adhesion to Al foil, polyester or other such base materials (i.e., the member to which adhesion is performed) could be obtained. This effect had not been anticipated.

The reason for this improvement in adhesion is not entirely clear, however, it is presumed to be as follows. Namely, polyolefin is oxidized when it comes into contact with air after being extruded out from an extruder or a T-die during melting and molding of the polyolefin. The polyolefin reacts with epoxy-compounds during this oxidation process, with epoxy-compounds first being grafted onto the polyolefin. Unreacted epoxy groups remaining in the grafted epoxy-compound molecule then react with the functional groups on the surface of the base material (i.e., the member to which adhesion is performed).

(c) Olefin Polymer

It is preferable to include an olefin polymer (c) having a functional group that reacts with the epoxy group in the molecule, in the resin composition that forms the (III) epoxy-group-containing resin composition layer (second resin composition).

Adhesion to the base material can be even further improved by adding this olefin polymer (c). This is because reactions occur between epoxy-compound (b) and the functional group that reacts with the epoxy group, and the amount of epoxy-compound grafted onto the resin composition increases.

The amount of olefin polymer (c) having this functional group that is employed is selected to be in the range of 30 wt % or less, preferably 2~25 wt %, and even more preferably 5~20wt %, of the total weight of polyolefin (a) and olefin polymer (c) containing functional groups. While an improvement in adhesion is realized if the amount of olefin polymer (c) having function groups is added in an amount exceeding 30 wt %, this is not economical.

Examples of the functional groups in olefin polymer (c) that react with epoxy group include carboxyl group and its derivatives, amino group, phenol group, hydroxyl group, thiol group and the like. From the perspective of balancing reactiveness and stability, it is preferable to select at least one from the group comprising acid anhydride group, carboxyl group, and carboxylic metal salts from among these.

Copolymerizing and grafting methods may be cited as examples of methods for introducing the functional group that reacts with the epoxy group.

For example, terpolymers between ethylene and a compound that reacts with ethylene may be cited as examples of an olfin polymer (c) having a functional group that is produced using a copolymerizing method. Examples of the compound employed in the copolymerization include, but are not limited to, such $\alpha,\beta$-unsaturated carboxylic acids as (meth)acrylic acid; such $\alpha,\beta$-unsaturated metal carboxylates as sodium (meth)acrylate; such unsaturated carboxylic acid anhydrides as maleic anhydride, itaconic anhydride, and citraconic anhydride; such hydroxyl group containing compounds as hydroxyethyl (meth)acrylate, (meth)aryl alcohol, and the like; and such unsaturated amino compounds as aryl amine. In addition to these unsaturated compounds, it is also acceptable to copolymerize such vinyl alcohols as acrylic ester, vinyl acetate, vinyl propionate, and the like. These compounds can be used in mixtures of two or more types in the copolymer with ethylene, and two or more types of copolymers between ethylene and these compounds may be used. In the present invention, it is particularly preferable to employ an ethylene-maleic anhydride copolymer or a ethylene-maleic anhydride-(meth)acrylate copolymer.

The olefin polymer (c), in which a functional group that can react with the epoxy group has been introduced through graft modification, is typically produced by using polyolefin, a radical generating agent like peroxides, and the graft modifying compound in the solution or melted state. The aforementioned polyolefin (a) may be used for the polyolefin employed in graft modification. In addition to LDPE, LLDPE, HDPE, and PP, ethylene-propylene copolymer, propylene-1-butene-copolymer, EVA, E(M)A, ethylene-vinyl acetate-(meth)acrylate copolymer and the like may be used. These may be used alone or in mixtures of two or more. In addition, it is also acceptable to graft modify a copolymer that includes an acid or its derivative, such as ethylene-(meth)acrylate-maleic anhydride copolymer, for example.

The type of radical generating agent employed in graft modification is not particularly restricted. The usual organic peroxides may be used, with dicumyl peroxide, 2,5-dimethyl-2,5-bis(t-butyl peroxide)hexane, 1,3-bis(2-t-butyl peroxyisopropyl)benzene, benzoyl peroxide and the like being preferred from the perspective of reactivity and handling.

Unsaturated compounds similar to compounds that can be copolymerized with the ethylene employed in the aforementioned copolymerization method can be employed as unsaturated compounds for graft modification. Basically, a compound may be employed provided that it has unsaturated group that can react with a radical, such as a carboxylic acid group or carboxylic acid anhydride group and their metal salts, amino group, hydroxyl group, etc. Examples of this type of unsaturated compound used for graft modification include, but are not limited to, unsaturated carboxylic acids such as (meth)acrylic acid; unsaturated metal carboxylates such as sodium (meth)acrylate; unsaturated carboxylic acid anhydrides such as maleic anhydride, itaconic anhydride, and citraconic anhydride; compounds containing an unsaturated hydroxyl group such as hydroxyethyl (meth)acrylate, and (meth)aryl alcohol; and unsaturated amino compounds such as aryl amine.

As desired, it is also acceptable to add such usual additives as antioxidants, plasticizers, lubricants, various stabilizers, blocking preventing agents, antistatic agents, pigments, various inorganic and organic fillers, etc. to the resin composition forming the (III) epoxy-group-containing resin composition layer within a range which does not impair the objectives of the present invention.

In order to obtain the first or second resin composition that forms the (III) epoxy-group-containing resin composition layer, a method may be employed in which the aforementioned polyolefin (a), epoxy-compound (b), and, as necessary, an olefin poilymer (c) having a functional group, are mixed together using a Henschel mixer, ribbon mixer, etc., or a method may be used in which the mixture is kneaded using an open roller, banbury mixer, kneader, or extruder. The kneading temperature is the temperature of the resin's melting point or more and 350° C. or less. A temperature of 120~300° C. is preferable for a polyethylene resin, while a temperature of 170~300° C. is preferable in the case of polypropylene resin.

OTHER SYNTHETIC RESIN MATERIAL LAYERS

(IV) Synthetic Resin Layer

In order to improve the value of the product in the present invention, it is desirable to provide a synthetic resin layer to the paper layer, for the purpose of adding a layer for printing or for design such a s gold or silver foil, for protecting the aforementioned, for adding transparency or gloss, or heat sealing capacity, rigidity, or mechanical strength such as resistance to puncturing or the like.

The aforementioned polyolefin (a), olefin polymer(c) having a functional group that reacts with epoxy group, and the like may be suitably employed as the synthetic resin layer mentioned above. In particular, an ethylene (co)polymer, and in particular, a low densitypolyethylene, which are formed using a high pressure radical polymerization method can be suitably employed from the perspective of good molding and workability during extrusion laminating. In addition, from the perspective of matters of mechanical strength, such as resistance to puncturing, a straight chain low density polyethylene or the like is preferably selected.

Further, when giving consideration to adhesiveness to the metal foil or the inorganic vapor deposited layer of the (II) gas barrier layer, a copolymer between ethylene and an $\alpha,\beta$-unsaturated carboxylic acid or its derivatives, such as ethylene-maleic anhydride copolymer, ethylene-maleic anhydride-(meth)acrylate copolymer, ethylene-(meth) acrylate copolymer or metal salts thereof, is suitable. These synthetic resins may be used alone, or in a mixture with other synthetic resins.

(V) Impact-resistant Resin Layer

It is preferable to add a (V)impact-resistant resin layer in the present invention in order to improve the container's function and mechanical strength when dropped or hit during transport.

It is preferable to employ a plastic film consisting of polyester, polyamide, polypropylene, polycarbonate, polystyrene or the like as the (V) impact-resistant resin layer, with PET film being suitably employed from among these.

This (V) impact-resistant resin layer may be laminated so as to be adjacent to the (III) epoxy-group-containing resin composition layer in the present invention. In this case, it is not particularly necessary to surface treat the (V) impact resistant resin layer. However, such surface treatments are desirable since adhesiveness will be improved. Examples of such surface treatments include a corona discharge treatment, flame treatment, UV irradiation treatment, electron beam irradiation treatment, or low temperature plasma treatment.

When even stronger adhesion is required, then it is even more suitable to carry out an in-line surface treatment during laminating. In addition, when extrusion laminating an epoxy-group-containing resin composition to form the (III) epoxy-group-containing resin composition layer, it is preferable to subject the adhering surface of the melted resin film of the epoxy-group-containing resin composition to the same surface treatment as the (V) impact-resistant resin layer, with an ozone treatment being particularly preferable.

(VI) Heat Sealing Layer

The present invention's (VI) heat sealing layer is a layer consisting of a material having heat sealing properties. The heat sealing layer disposed to the innermost layer and the heat sealing layer disposed to the outermost layer are designated as the (VIi) inner surface heat sealing layer and the (VIo) outer surface heat sealing layer, respectively.

Any synthetic resin may be employed provided it has excellent adhesion with the base material laminated next to this layer. For example, it is possible to use the first resin composition or second resin composition that form the epoxy-group-containing resin composition layer disclosed in the above (III), or polyolefin (a) used in the (III) epoxy-group-containing resin composition layer, or olefin polymer (c) having a functional group, etc.

In particular, when considering the container's ability to retain odors and maintain the heat seal, it is possible to add these functions by selecting any resin from among polyester resins, ethylene-vinyl alcohol copolymers, polycarbonate resins, or polyacrylonitril resins.

With regard to the function of retaining odors, it is acceptable to form the outer surface of the container with a material that has this property.

LAMINATE STRUCTURE

The present invention's laminate with gas barrier properties has at least a (I) paper layer, (II) gas barrier layer, and (III) epoxy-group-containing resin composition layer. The (II) gas barrier layer is disposed so as to be in contact with the (III) epoxy-group-containing resin composition layer. When the (II) gas barrier layer consists of a material having adhesiveness with the (I) paper layer 101, it is possible to form a laminate consisting of the three layers of (I) paper layer, (II) gas barrier layer, and (III) epoxy-group-containing resin composition layer. However, it is also acceptable to laminate a (IV) synthetic resin layer, (V) Impact-resistant Resin Layer, and/or (VI) Heat Sealing Layer at Suitable Positions.

METHOD FOR LAMINATING VARIOUS MATERIALS

The method for forming the present invention's laminate with gas barrier properties calls for forming a laminate having at least a (I) paper layer, (II) gas barrier layer, and (III) epoxy-group-containing resin composition layer, by forming the (III) epoxy-group-containing resin composition layer as the layer adjacent to the (II) gas barrier layer. In addition to a (I) paper, (II) gas barrier layer, and (III) epoxy-group-containing resin composition, the laminate may be formed to also include a (IV) synthetic resin layer, (V) impact-resistant resin layer, and (VI) heat sealing layer, as desired. The method for laminating these various layers is not particularly restricted. However, it is desirable to form the layers consisting of the resin materials, such as the (III) epoxy-group-containing resin composition layer, (IV) synthetic resin layer, and (IV) heat sealing layer, by extrusion molding. Specifically, an extrusion laminating method or extrusion sand laminating method in which the (I) paper layer, (II) gas barrier layer, or (V) impact-resistant resin layer is employed as a base material or sand base material is preferable from the perspective of productivity.

EXTRUSION LAMINATING METHOD

An extrusion laminating method is a processing method in which molding and adhesion are carried out simultaneously by employing an approach in which a melted resin film extruded from a T-die is continuously molded and applied on top of a base material. In the case of a polyethylene resin, the molding temperature when molding an extrusion laminate is in the range of 200~400° C. and usually is in the range of 240~370° C., with a range of 280~340° C. being even more typical.

If the molding temperature when molding an extrusion laminate is less than 200° C., sufficient adhesion strength cannot be obtained. Conversely, if the temperature is 400° C. or more, then not only is there a decrease in the ability to mold the material, but there is also a deterioration in such product qualities as the odor and heat sealing capacity of the obtained paper container. With respect to a propylene polymer, the molding temperature is selected to be 170° C. or more, usually in the range of 200~350° C., and more typically in the range of 240~320° C.

EXTRUSION SAND LAMINATING METHOD

An extrusion sand laminating method is a method in which a melted resin extruded from a T-die is held between two base materials, and molding and application are continuously carried out. In contrast to the usual extrusion laminate in which a two-layer structure is formed by laminating one melted resin layer on top of a single base material layer, in this method, it is possible to form a three-layer laminate in a single molding.

When forming the (III) epoxy-group-containing resin composition layer, a specific amount of a low molecular weight epoxy-compound (b) having a plurality of epoxy groups in the resin is mixed in during laminate molding. As a result, this low molecular weight epoxy-compound (b) bleeds out on the surface of the resin when the resin is melted, reacts with the carbonyl groups produced by oxidation of the resin in air, and thereby forms a strong bond. If a corona discharge treatment or other such surface treatment is performed to the paper or gas barrier layer, etc. that is adhered to the (III) epoxy-group-containing resin composition layer, then functional groups are generated that can react with epoxy groups such as carbonyl groups and the like due to this surface treatment. As a result, an epoxy group is introduced between these layers and the (III) epoxy-group-containing resin composition layer, generating a strong bridging bond via the epoxy group. Accordingly, in the present invention, it is important to select the specific amount of the low molecular weight epoxy-compound (b), which has a plurality of epoxy groups. In addition, these reactions can be carried out effectively if an olefin polymer (c) that includes functional groups which have the effect of generating carbonyl groups by oxidizing the resin is also employed.

Note that the surface treatment of the paper or gas barrier material mentioned above is not absolutely essential. Rather, it is acceptable to combine treatments such as an ozone treatment, oxygen treatment, corona discharge treatment, flame treatment, UV irradiating treatment, electron beam treatment, low temperature plasma treatment or the like as needed. It is preferable to carry out these treatments in-line prior to laminating during the extruding process.

In addition, it is a characteristic feature of the present invention's method for producing a laminate with gas barrier properties that low temperature molding or high-speed molding can be employed.

In other words, by employing the (III) epoxy-group-containing resin composition layer, adhesive strength can be significantly increased without using an anchor coat agent.

If a surface treatment such as an ozone treatment or the like is carried out to the surface of the (III) epoxy-group-containing resin composition layer, then the adhesive strength with other layers is increased. Thus, a faster molding speed is possible, and productivity can be improved. Alternatively, in the case where conventional productivity is maintained, molding can be carried out at a lower temperature.

In order to improve the adhesive strength of the laminate, not only in the case of the (III) epoxy-group-containing resin composition layer, but also in the case of a layer that consists of other resin materials, it is preferable to perform a surface treatment to the melted resin film when extrusion forming the resin material. An ozone treatment is preferred as the surface treating method for this melted resin film.

The degree of oxidation when performing the surface treatment of these various materials will differ depending on the type of material. In general, however, it is desirable to select the degree of oxidation to be in the range of 0.05~1.0, and more preferably to be in the range of 0.1~0.5. When the degree of oxidation is less than 0.05, then there is no improvement in adhesive strength. Alternatively, when the degree of oxidation exceeds 1.0, there are limitations with respect to the molding temperature and productivity. Further, a degree of oxidation in excess of 1.0 is undesirable as there is an increase in such negative factors as the generation of smoke during the processing steps and an unpleasant odor in the final product.

The method for measuring the degree of oxidation will be described below.

The degree of surface oxidation is measured using a Fourier transforming infrared spectrum measuring device (FTIR) and employing attenuated total reflection infrared spectrophotometry (ATR). The ATR method employs a crystal board made of germanium or KRS-5 (thallium bromide) through which infrared rays pass easily and which has a large rate of refraction. KRS-5 is employed in this method. The shape of the crystal board in cross-section is a trapezoid or parallelogram, with a 45° angle of incidence employed. One sample each is adhered to either side of the crystal board, with the arrangement set so that the beam reflects 15 times or more. In order to realize this number of reflections, the relationships between the crystal plate thickness $t_c$, crystal plate length $l_c$, and sample length $l_s$ is $l_s/t_c \geq 15$, $l_c \geq 1^s$.

For example, in the case of an (III) epoxy-group-containing resin composition layer, for the sample used for measurement employs a peeled surface that was peeled away from the boundary between the surface where the surface treatment of the (III) epoxy-group-containing resin composition in the laminate was performed, and another layer. Those samples which experience stretching of 5% or more, or in which wrinkling occurs, when peeled away cannot be used in the measurement. It is permissible to facilitate peeling by adding a solvent to the boundary, with water, methanol, ethanol and the like being suitably employed. It is desirable to sufficiently dry the sample prior to measurement. Ester type organic solvents, such as ethyl acetate, methyl ethyl ketone, and the like, cannot be used as. they generate an interfering peak in the measurement of the surface's infrared spectrum, and readily remain in the composition.

The water vapor included in air will impair the measurement of the infrared absorption spectrum near 1700 cm$^{-1}$, therefore the inside of the measurement device is sufficiently purged with nitrogen. The measurements are then carried out at a resolution setting of 4 cm$^{-1}$, and the infrared spectral absorption of the surface is recorded as the absorbance.

Data processing of the obtained surface infrared absorption spectrum is carried out based on the following. A base line is formed by joining two points on the spectrum at 1770 cm$^{-1}$ and 1680 cm$^{-1}$, and the difference between base line absorption and peak absorption at wavelength 1718 cm$^{-1}$, where the carbonyl absorption peak appears, is designated as carbonyl absorption $A_{1718}$.

Similarly, a base line is formed by joining two points on the spectrum at 1396 cm$^{-1}$ and 1329 cm$^{-1}$, and the difference between base line absorption and peak absorption at wavelength 1377 cm$^{-1}$, where the methyl group absorption peak appears, is designated as methyl absorption $A_{1377}$.

The degree of surface oxidation is expressed as the ratio of these two degrees of absorption, and, based on this nondimensional number $A_{1718}/A_{1377}$, is designated as the surface oxidation.

PAPER CONTAINER EMBODIMENTS

From among the aforementioned materials, the present invention's paper container has at least a (I) paper layer, (II) gas barrier layer, and (III) epoxy-group-containing resin composition layer, and is produced by forming into a suitable shape a laminate in which the (II) gas barrier layer is laminated so as to be adjacent to the (III) epoxy-group-containing resin composition layer. Of the aforementioned three layers, the (I) paper layer is disposed further to the outside of the container than the other two layers, and the (III) epoxy-group-containing resin composition layer is disposed further to the inside of the container than the other two layers.

Figure 6:
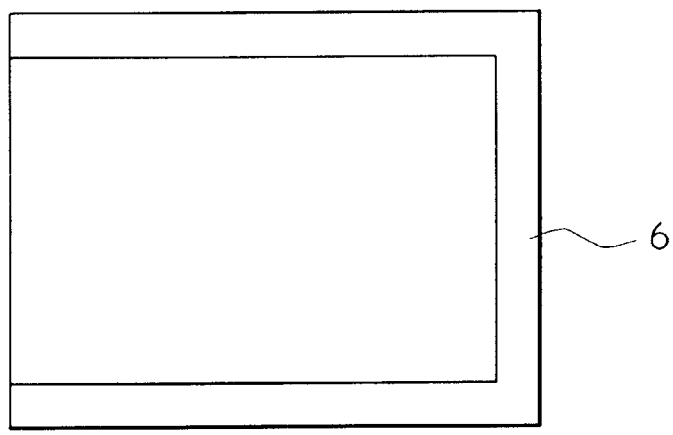
FIG. 6 is a planar view showing an example of the design of a paper container having gas barrier properties.
Figure 7:
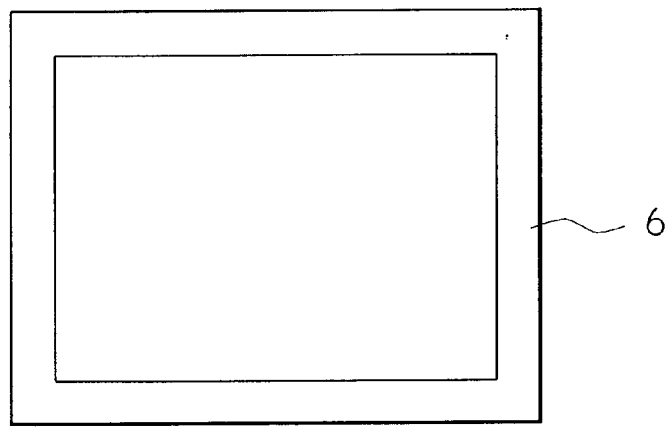
FIG. 7 is a planar view showing another example of the design of a paper container having gas barrier properties.

Embodiments of the paper container are not particularly restricted. For example, such embodiments may be suitably employed for a soft packaging paper container as a three-way sealing sack, such as shown in FIG. 6, or a four-way sealing sack, such as shown in FIG. 7. In the figures, the numeric symbol 6 indicates the heat seal area. A paper container of this type of embodiment can be preferably employed as a container for packaging dry food products, or powdered or granulated medicinal products.

Figure 8:
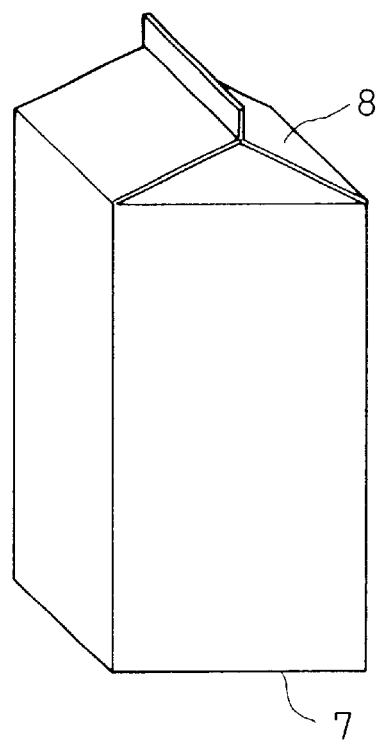
FIG. 8 is a perspective view showing another embodiment of a paper container having gas barrier properties.
Figure 9:
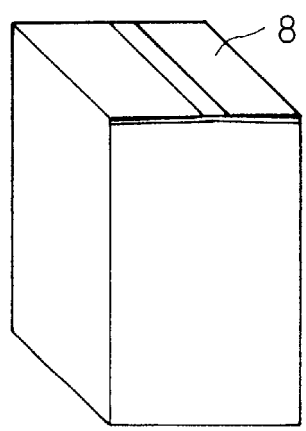
FIG. 9 is a perspective view showing another embodiment of a paper container having gas barrier properties.

A square-shaped container of an embodiment such as shown in FIGS. 8 and 9 is suitable as a paper container for holding a liquid. In the example in FIG. 8, the top portion 8 of a container, which is in the shape of a square column and has a square-shaped bottom potion 7, has a shape which is roughly that of a gabled roof. In the example in FIG. 9, top portion 8 is formed into a planar rectangular parallelopiped.

A paper container with this type of shape can be preferably employed as a container for holding beverages such as mineral water, juice, fruit juice, refined sake, spirits and the like.

First Embodiment

FIG. 1 shows a first embodiment of the present invention, and is a cross-sectional diagram of the laminate that forms the paper container. In this embodiment, a (IV) synthetic resin layer 102, (II) gas barrier layer 103, and (III) epoxy-group-containing resin composition layer 104 are sequentially laminated onto one surface of the (I) paper layer 101. The (I) paper layer 101 is formed so as to be on the outer surface of the container. From among the materials disclosed in (II) above, a plastic film monolayer, which has a low rate of gas permeability, or an inorganic vapor deposited synthetic resin layer is employed as the (II) gas barrier layer 103 in this embodiment. It is particularly preferred to employ an inorganic vapor deposited polyester layer in which an inorganic vapor deposited layer 2 is formed onto a polyester layer 1. Inorganic vapor deposited layer 2 is disposed to the side of polyester layer 1 directed to the outside of the container, and is laminated to be in contact with the (IV) synthetic resin 102.

The resin composition forming the (III) epoxy-group-containing resin composition layer 104 in this embodiment is laminated in an arrangement such that a resin composition is heat melted onto polyester layer 1 of the (II) gas barrier layer 103. As a result, laminating and a strong adhesion can be carried out without using a laminate adhesive agent or an extrusion laminate AC agent. A heat press method or the like can be employed for this type of melted lamination layer, however, the aforementioned extrusion laminating method is even more suitably employed.

A variety of methods may be employed to laminate (I) paper layer 101 and (IV) synthetic resin layer 102, or (IV) synthetic resin layer 102 and (II) gas barrier layer 103. However, a suitably employed method is one in which (I) paper layer 101, (IV) synthetic resin layer 102, and (II) gas barrier layer 103 are simultaneously laminated, wherein (I) paper layer 101 is employed as the base material, (II) gas barrier layer 103 employed as the sand base material, and (IV) synthetic resin layer 102 is extrusion sand laminated.

In the case of a container formed using a laminate produced with the above design, a (II) inorganic vapor deposited layer 2 is disposed to the inner side of (I) paper layer 101 and (IV) synthetic resin layer 102, which are permeable to oxygen, water vapor or the like. As a result, it is possible to obtain a container that has a strong adhesive strength without using an anchor coat agent, and which has a good gas barrier capacity such that oxygen, water vapor or the like are prevented from passing from the outside to the inside of the container.

In addition, (III) epoxy-group-containing resin composition layer 104 is disposed as the innermost layer of the container, so that a heat sealing ability is provided.

The (IV) synthetic resin layer 102, which can adhere to (I) paper layer 101, is laminated on to (I) paper layer 101, and (II) inorganic vapor deposited layer 2, which can adhere to (IV) synthetic resin layer 102, is laminated on to (IV) synthetic resin layer 102. Inorganic vapor deposited layer 2 is formed on to polyester layer 1 by vapor deposition. An (III) epoxy-group-containing resin composition layer 104, which can strongly adhere to a polyester base material, is laminated on to polyester layer 1. As a result, the adhesive capacity between layers is superior, and production can be carried out without using a dry laminate adhesive agent or extrusion laminate AC agent. Accordingly, an organic solvent is not employed during manufacture, which is desirable from the perspective of the manufacturing environment, and is advantageous in that organic solvent does not remain in the final product.

A gas barrier paper container such as in this embodiment has a superior gas barrier that prevents oxygen, water vapor or the like from passing through to the inside of the container. Thus, this container is excellent with respect to long term storage, room temperature transport, and aseptic packaging, and is suitably employed for holding beverages such as mineral water, juice, fruit juice, refined sake, spirits and the like, or for holding powdered or granulated medicinal or food products.

The paper container of the first embodiment described above is formed of a laminate consisting of (I) paper layer 101/(IV) synthetic resin layer 102/(II) gas barrier layer 103/(III) epoxy-group-containing resin composition layer 104. It is, however, acceptable to laminate an additional layer to the outside or inside of this laminate.

Second Embodiment

Figure 2:
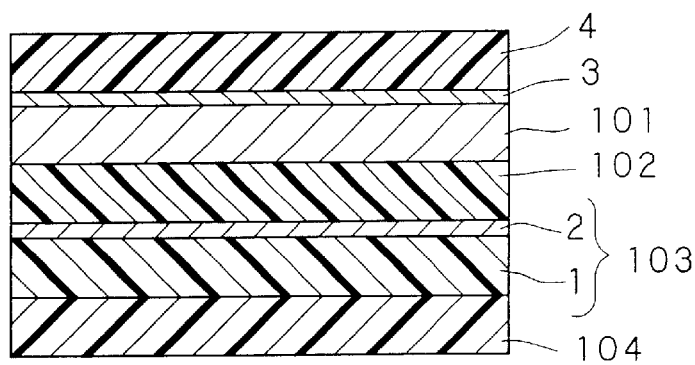
FIG. 2 is a cross-sectional diagram showing a laminate according to a second embodiment of the present invention.
Figure 3:
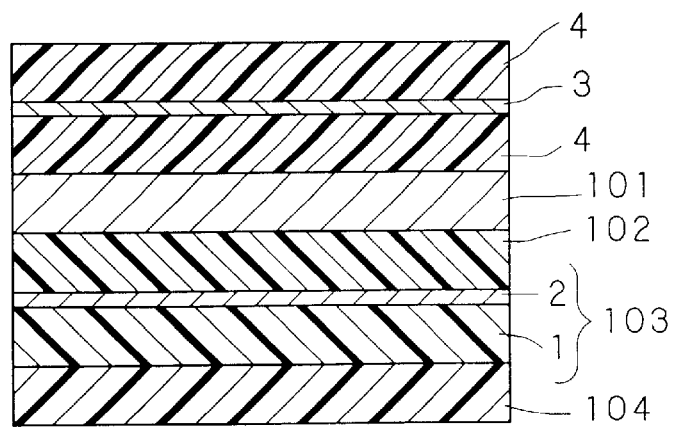
FIG. 3 is a cross-sectional diagram showing a laminate according to a third embodiment of the present invention.
Figure 4:
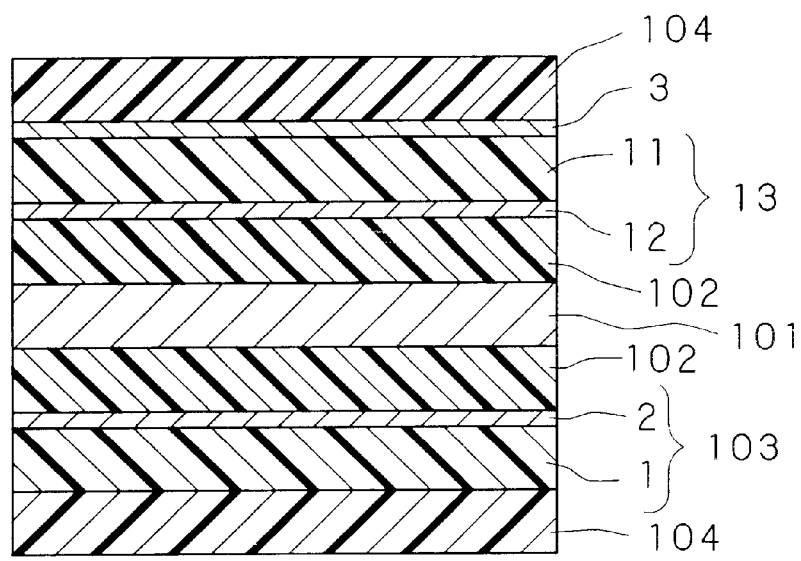
FIG. 4 is a cross-sectional diagram showing a laminate according to a fourth embodiment of the present invention.

FIG. 2 is a laminate according to the second embodiment. The laminate according to this embodiment is formed by sequentially laminating a printed layer 3 and a LDPE layer 4 on to paper layer 101 of the laminate shown in FIG. 1. When forming a container of this type of laminate, the layers in order from the outside of the container are LDPE layer 4/printed layer 3/(I) paper layer 101/(IV) synthetic resin layer 102/(II) gas barrier layer 103/(III) epoxy-group-containing resin composition layer 104.

Not only are the same effects obtained as in the first embodiment, but in addition, printing is carried out to the outer surface of (I) paper layer 101 in this design. As a result, a paper container which is superiorly designed for use as a packaging container is obtained, and information required to appear on the container can be displayed in print. In addition, printed layer 3 is protected by LDPE layer 4, which is the outermost layer of the container, and moisture is prevented from penetrating through to (I) paper layer 101. Thus, this design is suitable to form a paper container for a liquid. Further, heat sealing is possible on both surfaces of the laminate, which is convenient for the process of forming the container.

LLDPE, propylene polymer, EVA, E(M)A, ethylene-maleic anhydride copolymer, ethylene-maleic anhydride-(meth)acrylate copolymer, E(M)AA, or metal salts thereof may be employed instead of LDPE.

Third Embodiment

The third embodiment is formed by additionally laminating LDPE layer 4, printed layer 3 and a LDPE layer 4 in sequence on top of paper layer 101 of the laminate shown in FIG. 1. When forming a container of this type of laminate, the layers in order from the outside of the container are LDPE layer 4/printed layer 3/LDPE layer 4/(I) paper layer 101/(IV) synthetic resin layer 102/(II) gas barrier layer 103/(III) epoxy-group-containing resin composition layer 104.

The same effects are obtained as in FIG. 1 and the second embodiment. In addition, however, since a LDPE layer 4 is provided in between printed layer 3 and paper layer 101, printing can be carried out to LDPE layer 4, which has a smooth surface. Accordingly, clearer printing is enabled as compared to when printing on a rough surface. Thus, there is an even greater improvement in packaging container's design potential.

LLDPE, propylene polymer, EVA, E(M)A, ethylene-maleic anhydride copolymer, ethylene-maleic anhydride-(meth)acrylate copolymer, E(M)AA or metal salts thereof may be employed instead of LDPE.

Fourth Embodiment

The fourth embodiment is formed by additionally laminating (IV) synthetic resin layer 102, a (II) metal vapor deposited polyester layer 13 that has a metal vapor deposited layer 12 on its inner surface, printed layer 3, and an (III) epoxy-group-containing resin composition layer 104, on to (I) paper layer 101 of the laminate shown in FIG. 1. When forming a container of this type of laminate, the layers in order from the outside of the container are (III) epoxy-group-containing resin composition layer 104/printed layer 3/(V) polyester layer 11/(II) metal vapor deposited layer 12/(IV) synthetic resin layer 102/(IV) paper layer 101/(IV) synthetic resin layer 102/(II) gas barrier layer 103/(III) epoxy-group-containing resin composition layer 104.

The same effects are obtained as in FIG. 1 and the second embodiment. In addition, however, since a metal vapor deposited layer 12 is present on the outside of (III) paper layer 101, a packaging container is obtained that is of superior design, having a metallic gloss.

Fifth Embodiment

Figure 5:
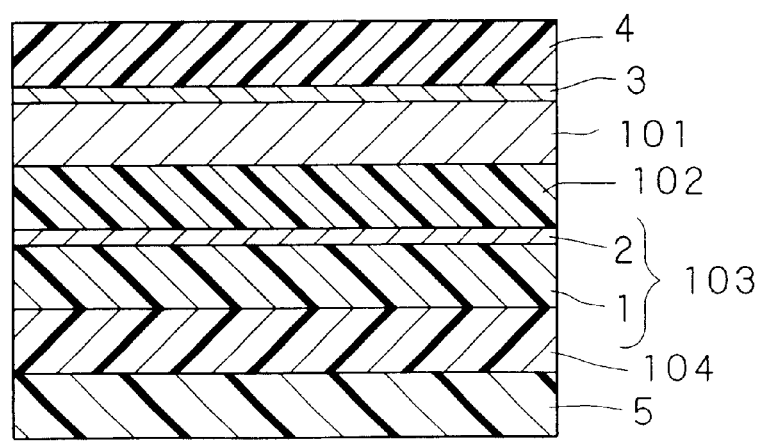
FIG. 5 is a cross-sectional diagram showing a laminate according to a fifth embodiment of the present invention.

In the embodiment shown in FIG. 5, a printed layer 3 and a LDPE layer 4 are sequentially laminated on top of paper layer 101 in the laminate shown in FIG. 1, and an LDPE layer 5 is laminated on top of an (III) epoxy-group-containing resin composition 104. Thus, in this design the order of the layers is LDPE layer 4/printed layer 3/(I) paper layer 101/(IV) synthetic resin layer 102/(II) gas barrier layer 103/(III) epoxy-group-containing resin composition layer 104/(VI) LLDPE layer 5.

In this design, the same effects are obtained as in FIG. 1 and the second embodiment. In addition, however, since a (VI) LLDPE layer 5 is provided to the inner surface of an (III) epoxy-group-containing resin composition 104, the seal strength is increased and the container's resistance to breaking if dropped is improved. In addition, it is possible to reduce the thickness without decreasing the strength.

LLDPE, propylene polymer, EVA, E(M)A, ethylene-maleic anhydride copolymer, ethylene-maleic anhydride-(meth)acrylate copolymer, E(M)AA or metal salts thereof may be employed instead of LDPE.

Note that in the first through fifth embodiments, inorganic vapor deposited layer 2 of (II) gas barrier layer 103 is disposed closer to the outer surface of the container than polyester layer 1. However, it is also acceptable to dispose this layer closer to the container's inner surface than polyester layer 1. In this case, however, polyester layer 1 and (III) epoxy-group-containing resin composition layer 104 must be adhered together by laminating (III) epoxy-group-containing resin composition layer 104 to the side of (II) gas barrier layer 103 that is directed toward the outer surface of the container. In this case, provided that there is adherence and a heat seal can be achieved with inorganic vapor deposited layer 2 on the side of (II) gas barrier layer 103 that is directed toward the inside of the container, i.e., on the side of inorganic vapor deposited layer 2 that is directed toward the inside of the container, then it is acceptable to laminate (IV) synthetic resin layer 102, laminate (III) epoxy-group-containing resin composition layer 104, or laminate both, on to inorganic vapor deposited layer 2.

In addition, in the preceding first through fifth embodiments, a (IV) synthetic resin layer 102 was laminated in between (I) paper layer 101 and (II) gas barrier layer 103. However, it is also acceptable to employ (III) epoxy-group-containing resin composition layer 104 in between (I) paper layer 101 and (II) gas barrier layer 103, since it can adhere to (I) paper layer 101.

Alternatively, it is acceptable to laminate both (IV) synthetic resin layer 102 and (III) epoxy-group-containing resin composition layer 104 on to (I) paper layer 101. In the case where (II) gas barrier layer 103 is formed of a plastic film monolayer, or where adhesiveness can be obtained between the (I) paper layer 101 and (II) gas barrier layer 103, then a design is possible in which (I) paper layer 101 and (II) gas barrier layer 103 are directly laminated, and a (IV) synthetic resin layer 102 is not provided.

Sixth Embodiment

Figure 10:
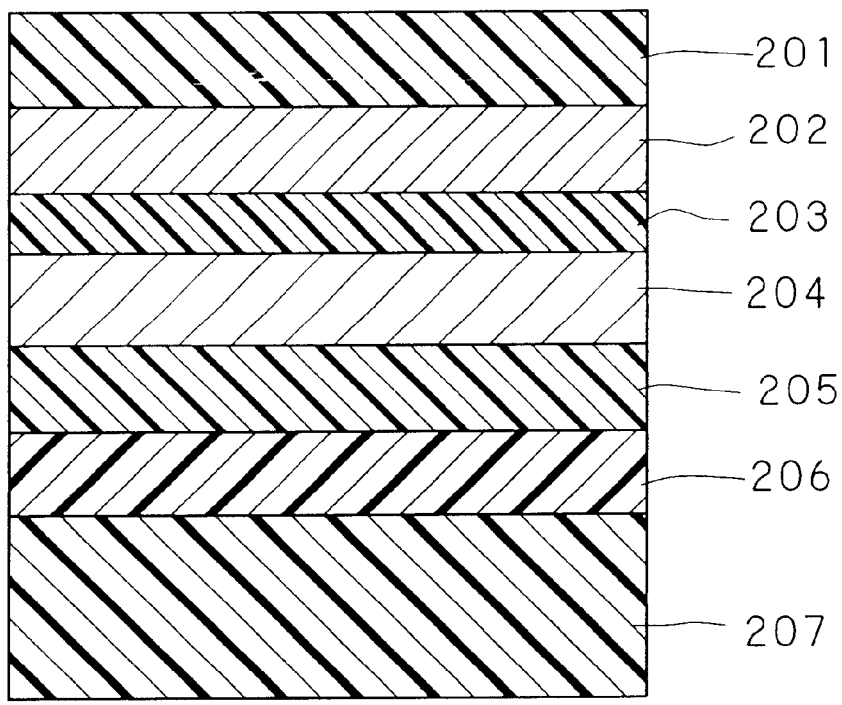
FIG. 10 is a cross-sectional view showing a laminate according to a sixth embodiment of the present invention.

FIG. 10 shows the sixth embodiment of the laminate forming the paper container according to the present invention. In this embodiment, a (VIo) outer surface heat sealing layer 201 is laminated to one side of (I) paper layer 202, and (IV) synthetic resin layer 203, (II) gas barrier layer 204, (III) epoxy-group-containing resin composition layer 205, (V) impact-resistant resin layer 206 and (VIi) inner surface heat sealing layer 207 are sequentially laminated to the other surface. The paper container employing this laminate is formed so that (VIi) inner surface heat sealing layer 207 becomes the innermost layer.

In this embodiment, a metal foil is suitably employed from among the materials disclosed in (II) above as (II) gas barrier layer 204. In addition, a plastic film monolayer which has a small rate of gas diffusion may be employed.

The materials disclosed in (IV) above are acceptable as the resin composition for forming (IV) synthetic resin layer 203. The epoxy-group-containing resin composition disclosed in (III) above is also acceptable. If an epoxy-group-containing resin composition is employed, excellent adhesiveness with (II) gas barrier layer 204 is obtained.

In addition, the (III) epoxy-group-containing resin composition disclosed in (III) above can be used as (VIi) inner surface heat sealing layer 207 in this embodiment. Accordingly, (VIi) inner surface heat sealing layer 207 can be provided adjacent to (V) impact-resistant resin layer 206. When employing a synthetic resin disclosed in (IV) above as (VIi) inner surface heat sealing layer 207, it is desirable to introduce a layer consisting of an epoxy-group-containing resin composition disclosed in (III) in between (V) impact-resistant resin layer 206 and (VIi) inner surface heat sealing layer 207. As a result, good adhesiveness between the layers can be obtained.

(VIo) outer surface heat sealing layer 201 and (VIi) inner surface heat sealing layer 207 can be formed of the same resin, or may be formed of a different resin.

When forming a sack-shaped paper container as shown in FIGS. 6 and 7, for example, it is not necessary to have a heat seal on the outer surface of the container provided that a good heat seal can be obtained on the inner surface of the container. For this reason, a design is acceptable in which (VIo) outer surface heat sealing layer 201 is not provided.

Conversely, when forming a paper container having the shape shown in FIGS. 8 and 9 for example, it is necessary to have a heat seal on both the outer and inner surfaces of the container. A design is desirable in which both a (VIo) outer surface heat sealing layer 201 and (VIi) inner surface heat sealing layer 207 are provided.

This embodiment's laminate can be produced without using a dry laminate adhesive-agent or an extrusion laminate AC agent, by employing an extrusion laminating method or an extrusion sand laminating method. For example, the present invention's laminate can be produced by following the four-stage process as follows below.

First, using a single laminator equipped with a T-die, (VIo) outer surface heat sealing layer 201 is extrusion laminated while carrying out an in-line corona discharge treatment with (I) paper layer 202 employed as the base material. In this way, a laminate between (VIo) outer surface heat sealing layer 201 and (I) paper layer 202 is obtained.

Next, (I) paper layer 202 of the obtained laminate is employed as the base layer, and the metal foil of (II) gas barrier layer 204 is employed as the sand base material. (IV) synthetic resin layer 203 is extrusion sand laminated, to obtain a laminate consisting of the layers from (VIo) outer surface heat sealing layer 201 through (II) gas barrier layer 204.

Next, (III) epoxy-group-containing resin composition 205 is extrusion sand laminated, employing the (II) gas barrier layer 204 of the obtained laminate as the base material, and polyester film consisting of (V) impact-resistant resin layer 206 as the sand base material. Then, (VIi) inner surface heat sealing layer 207 is extrusion laminated employing (V) impact-resistant resin layer 206 as the base material, to obtain a laminate of the design shown in FIG. 10.

Alternatively, it is also possible to carry out continuous extrusion laminating of each of the layers. Thus, two-stage tandem laminating employing a tandem laminator can be used to produce the this embodiment's laminate.

For example, a tandem laminator equipped with a T-die is employed, and (IV) synthetic resin layer 203 is extrusion sand laminated at the first stage extruder, with one surface of (I) paper layer 202 employed as the base material, and the metal foil of (II) gas barrier layer 204 employed as the sand base material. (VIo) outer surface heat seal 201 is extrusion laminated at the second stage extruder, with the other surface of (I) paper layer 202 employed as the base material. In this way, the laminate consisting of the layers from (VIo) outer surface heat sealing layer 201 through (II) gas barrier layer 204 is obtained.

Next, (III) epoxy-group-containing resin composition layer 205 is extrusion sand laminated employing a tandem laminator, with (II) gas barrier layer 204 of the laminate obtained at the first extruder employed as the base material, and polyester film consisting of (V) impact-resistant resin layer 206 employed as the sand base material. A laminate having the composition shown in FIG. 10 is then obtained by extrusion laminating (VIi) inner surface heat sealing layer 207 at the second extruder, with (V) impact-resistant resin layer 206 employed as the base material.

In this embodiment's paper container, a (II) gas barrier layer 204 is disposed to the inside of (VIo) outer surface heat sealing layer 201, (I) paper layer 202, and (IV) synthetic resin layer 203, which are permeable to oxygen, water vapor, etc. As a result, oxygen, water vapor and the like from the outside is prevented from penetrating through to the inside of the container. Thus, excellent gas barrier and odor retaining properties are obtained. In addition, a (V) impact-resistant resin layer 206 is provided, which is suitable for forming a three dimensional shape container and can prevent damage to the container when dropped, etc.

A (VIo) outer surface heat sealing layer 201 is provided as the outermost layer of the container and a (VIi) inner surface heat sealing layer 207 is provided as the innermost layer of the container. As a result, a heat seal is obtained between the inner and outer surfaces of the container.

A (VIo) outer surface heat sealing layer 201 that will adhere to the outer surface of (I) paper layer 202 is laminated on to the outer surface of (I) paper layer 202. (I) Paper layer 202 and (II) gas barrier layer 204 are laminated together via a (IV) synthetic resin layer 203 that will adhere to both of the aforementioned layers. In addition, (II) gas barrier layer 204 and (V) impact-resistant resin layer 206, which have conventionally been laminated together using a dry laminate adhesive agent, are laminated together via (III) epoxy-group-containing resin composition layer 205, which adheres strongly with the aforementioned layers. (VIi) inner surface heat sealing layer 207, which adheres to (V) impact-resistant resin layer 206, is laminated on to impact-resistant resin layer 206. Thus, the adhesion between layers is excellent. At the same time, the laminate can be produced without using a dry laminate adhesive agent or an extrusion laminate AC agent. Accordingly, it is not necessary to provide time for the adhesive agent to dry (aging time) during the production process. Thus, production efficiency is improved. Moreover, an organic solvent is not employed during production, making this approach desirable from the perspective of the work environment and production costs. In addition, there is also a benefit in the fact that there is no organic solvent remaining in the final product. Further, since the laminate for forming the paper container can be produced using an extrusion laminating method or an extrusion sand laminating method, the production process is simplified. Moreover, since a laminate having the structure shown in FIG. 10 can be produced using two-stage tandem extrusion laminating, an improved productivity can be realized.

A gas barrier paper container such as in this embodiment has a superior gas barrier that prevents oxygen, water vapor or the like from passing through to the inside of the container. Thus, this container is excellent with respect to long term storage, room temperature transport, and use as aseptic packaging, and has superior impact-resistance. Thus, this paper container is particularly suitable for use as a packaging container for mineral water, juice, fruit juice, refined sake, spirits and the like, or for holding powdered or granulated medicinal or food products.

The paper container according to this embodiment is formed of a laminate consisting of (VIo) outer surface heat sealing layer 201/(I) paper layer 202/(IV) synthetic resin layer 203/(II) gas barrier layer 204/(III) epoxy-group-containing resin composition layer 205/(V) impact-resistant resin layer 206/(VIi) inner surface heat sealing layer 207. However, other appropriate layers may be included at a suitable location within these layers, within limits that do not impair adhesiveness between the layers.

Seventh Embodiment

Using a suitable printing method, a printed layer may be formed in between (I) paper layer 202 and (VIo) outer surface heat sealing layer 201 in a seventh embodiment of the present invention. As a result, not only are the same effects obtained as in the case of the sixth embodiment, but a paper container of superior design for use as a packaging container is obtained. Moreover, information which must be displayed can be printed on the package.

Eighth Embodiment

In the design according to an eighth embodiment of the present invention, the order of the layers from the outside of the container is (VIo) outer surface heat sealing layer 201/printed layer/LDPE layer/(I) paper layer 202/(IV) synthetic resin layer 203/(II) gas barrier layer 204/(III) epoxy-group-containing resin composition layer 205/(V) impact-resistant resin layer 206/(VIi) inner surface heat sealing layer 207. As a result, the same effects are obtained as in the sixth and seventh embodiments. Moreover, since printing can be carried out on the smooth-surfaced LDPE layer, clearer printing is enabled as compared to when printing on a rough surface. Thus, design quality as a packaging container can be improved. Note that LLDPE, propylene polymer, EVA, E(M)A, ethylene-maleic anhydride copolymer, ethylene-maleic anhydride-(meth)acrylate copolymer, E(M)AA or metal salts thereof may be employed instead of LDPE.

Ninth Embodiment

In the design according to a ninth embodiment of the present invention, the order of the layers from the outside of the container is (VIo) outer surface heat sealing layer 201/printed layer/(V) polyester film/(III) epoxy-group-containing resin composition layer/(II) metal vapor deposited synthetic resin layer having a metal vapor deposited layer at the inner layer/ (IV) synthetic resin layer/(I) paper layer 202/(IV) synthetic resin layer 203/(II) gas barrier layer 204/(III) epoxy-group-containing resin composition layer 205/(V) impact-resistant resin layer 206/(VIi) inner surface heat sealing layer 207. As a result, the same effects are obtained as in the sixth and seventh embodiments. In addition, since a metal vapor deposited layer is present on the outside of (I) paper layer 202, a superiorly designed packaging container is obtained that has a metallic gloss.

Tenth Embodiment

In a tenth embodiment of the present invention, the order of the layers is (VIo) outer surface heat sealing layer 201/printed layer/(I) paper layer 202/(IV) synthetic resin layer 203/(II) gas barrier layer 204/(III) epoxy-group-containing resin composition layer 205/(V) impact-resistant resin layer 206/(VI) LLDPE layer. In this design, the same effects are obtained as in the sixth and seventh embodiments. In addition, the innermost layer consists of LLDPE, so that an excellent seal strength is obtained, and an improved resistance to breaking if the container is dropped is realized. In addition, it is possible to reduce the thickness without decreasing the strength.

Note that if LDPE is employed in place of LLDPE, a paper container that is inexpensive, has minimal odor and no additives is obtained. Further, if PET, ethylene-vinyl alcohol copolymer, polycarbonate resin, or polyacrylonitrile resin is employed in place of LLDPE, than a paper container is obtained that is superior with respect to odor retention.

Note that in the sixth through tenth embodiments, (II) gas barrier layer 204 is disposed further to the outside of the container than (V) impact-resistant resin layer 206. However, it is also acceptable for (II) gas barrier layer 204 to be disposed closer to the inside of the container than (V) impact-resistant resin layer 206. However, in this case, the layer adjacent to (V)-impact-resistant resin layer 206 must be employed as the (III) epoxy-group-containing resin composition layer. In this case, the layer adjacent to (II) gas barrier layer 204 must be formed of a resin composition that will adhere with (II) gas barrier layer 204. When this layer serves as the innermost layer, a heat seal is required. For example, it is desirable to employ the layer adjacent to (II) gas barrier layer 204 as the (III) epoxy-group-containing resin composition layer. In addition, (V) impact-resistant resin layer 206 can be disposed at an optional position within limits that do not impair the heat seal required of the laminate.

The effects of the present invention will now be made clear through specific examples. Note, however, that the present invention is not limited to these examples.

EXAMPLES 1~6, COMPARATIVE EXAMPLES 1~3

(1) Components of Resin Composition

The following were employed as the components of the resin composition in the Examples and Comparative Examples below.

polyolefin (a)
  a1: LDPE having MFR 4.0 g/10 minutes, density 0.921 g/cm$^3$
  a2: LDPE having MFR 4.0 g/10 minutes, density 0.917 g/cm$^3$
epoxy-compound (b)
  b1: epoxidized soybean oil (O-130P, manufactured by Asahi Denka Kogyo K.K.)
  b2: epoxidized linseed oil (O-180A, manufactured by Asahi Denka Kogyo K.K.)
olefin polymer (c)
  c1: ethylene-maleic anhydride copolymer (maleic anhydride content=1.5 wt %, MFR=9.2 g/10 minutes)
  c2: ethylene-maleic anhydride-ethyl acrylate copolymer (maleic anhydride content=1.8 wt %, ethyl acrylate content=12.5 wt %, MFR=10.1 g/10 minutes)

(2) Method for Laminating Layers

When not specifically disclosed in the following Examples and Comparative Examples, the formation of the laminate was carried out as follows.

Resin composition pellets were laminated to various types of base materials using an extrusion laminating molding device (manufactured by Modern Machinery Co. LTD having a φ90 mm diameter extruder. The distance from the T-die to the nip roller was 120 mm and the laminating speed was 100 m/minutes. A corona discharge treatment (manufactured by Pira) of a specific discharge density was carried out at the same time as needed.

(3) Measurement of Adhesive Strength

The adhesive strength of the laminate produced in the Examples and Comparative Examples below was measured in the following manner. The result of these measurements are shown in Table 1.

The obtained laminate was cut into 15 mm wide oblong strips along the direction of flow within the device, and was peeled at the boundary between the gas barrier layer and the epoxy-group-containing resin composition layer. Adhesive strength was designated based on peeling strength in a T-peeling test with 5 samples and a peeling speed of 300 mm/min. In the case where the layer tore as the epoxy-group-containing resin composition layer was pulled to peel it off from the polyester layer, adhesive strength was designated based on the value of the highest point on the chart, and was expressed in Table 1 using the symbol ">".

(4) Formation of Paper Container

In the following Examples and Comparative Examples, the laminate produced above was employed to form a paper container as follows.

The obtained laminate was cut into pieces of 15 cm×30 cm in size, folded in half and heat sealed on three sides for 3 seconds at 200° C. using a heat sealer, to form a 15 cm×15 cm paper container.

EXAMPLE 1

LDPE (a2) was employed as the polyolefin (a) in the composition that forms the (III) epoxy-group-containing resin composition layer 104. For the epoxy-compound (b), epoxidized soybean oil (b1) was prepared in the amount of 0.9 parts by weight with respect to 100 parts by weight of LDPE (a2). These components were dry blended in a Henschel mixer, after which a φ30 mm biaxial extruder was employed to melt and knead the dry blend into pellets.

A 53 g/m² high-quality paper was employed for (I) paper layer 101, the base material. Al vapor deposited PET film (Oike Kogyo K.K. Teto (Light)) was employed as (II) gas barrier layer 103, the sand base material. For (IV) synthetic resin layer 102, LDPE (a1) was extrusion sand laminated to a thickness of 15 μm at a resin temperature of 320° C. and a withdrawing speed of 100 m/min, while at the same time performing a corona discharge treatment in-line to (I) paper layer 101. The output and electrode width in the corona discharge treatment were 7 KW and 600 mm, respectively. As a result, a laminate consisting of the layers from paper layer 101 through (II) gas barrier layer 103 was obtained. Note that the inorganic vapor deposited layer 2 of (II) gas barrier layer 103 was laminated so as to be in contact with (IV) synthetic resin layer 102.

The (III) epoxy-group-containing resin composition layer 104 composition was extrusion laminated to a laminate thickness of 30 μm onto the polyester layer 1 of (II) gas barrier layer 103 in the obtained laminate. The extrusion laminating was performed at a resin temperature of 320° C. and a withdrawing speed of 100 m/min. A laminate having the structure shown in FIG. 1 was produced as a result. This was subjected to three-way sealing to a size of 15 cm×15 cm, to form a paper container. The results of adhesive strength measurements are shown in the following Table 1.

In this example, it was possible to form a paper container with gas barrier properties that had sufficient adhesive strength for practical applications without using any organic solvent.

EXAMPLE 2

The composition was formed in the same way as in Example 1 above, with the exception that 0.1 parts by weight of an epoxidized soybean oil (b1) was employed for epoxy-compound (b) in the composition forming the (III) epoxy-group-containing resin composition layer 104. Laminating and formation of the paper container was performed in the same manner as in Example 1, with the exception that silica vapor deposited PET was employed for (II) gas barrier layer 103, and ethylene-maleic anhydride-ethyl acrylate copolymer (c2) was extrusion sand laminated as the (IV) synthetic resin layer 102 at a resin temperature of 220° C. The results of adhesive strength measurements are shown in Table 1 below.

In this example, it was possible to form a paper container with gas barrier properties that had sufficient adhesive strength for practical applications without using any organic solvent.

EXAMPLE 3

Paper board (weight: 200 g/m²) was employed as the paper material for (I) paper layer 101. An extrusion laminating method was employed to laminate LDPE (a1) in advance to the outer surface of (I) paper layer 101, which serves as the outer surface of the container. The resin temperature was 320° C., the withdrawing speed was 100 m/min, and the laminate thickness was 15 μm. With these exceptions, the formation of the composition, laminating and production of the paper container were formed in the same manner as in Example 1. The results of adhesive strength measurements are shown in Table 1 below.

In this example, as in the case of Example 1, it was possible to form a paper container with gas barrier properties that had sufficient adhesive strength for practical applications without using any organic solvent.

EXAMPLE 4

Formation of the composition, laminating and production of the paper container were carried out in the same manner as in Example 1, with the exception that an epoxidized linseed oil (b2) was used as the epoxy-compound (b) in the composition forming (III) epoxy-group-containing resin composition layer 104. The results of adhesive strength measurements are shown in Table 1 below.

In this example, as in the case of Example 1, it was possible to form a paper container with gas barrier properties that had sufficient adhesive strength for practical applications without using any organic solvent.

EXAMPLE 5

For the composition forming (III) epoxy-group-containing resin composition layer 104, a composition was used in which LDPE (a1) was employed for the (a) polyolefin, ethylene-maleic anhydride copolymer (c1) was employed for the (c) olefin composition having functional groups that can react with epoxy group, and the weight ratio of LDPE (a1) and ethylene-maleic anhydride copolymer (c1) was 85/15, wherein 0.8 parts by weight of an epoxidized soybean oil (b1) was added to 100 parts by weight of this composition, followed by melting and kneading. With this exception, laminating and formation of the paper container were carried out in the same manner as in Example 1. The results of adhesive strength measurements are shown in Table 1 below.

In this example, as in the case of Example 1, it was possible to form a paper container having gas barrier properties that had sufficient adhesive strength for practical applications without using any organic solvent.

Moreover, by adding a (c) polyolefin polymer having a functional group that can react with epoxy group, it is possible to still further improve the adhesiveness of (III) epoxy-group-containing resin composition layer 104 to (II) gas barrier layer 103.

EXAMPLE 6

With the exception that ethylene-maleic anhydride copolymer (c1) was employed as (IV) synthetic resin layer 102, and oxidized Al vapor deposited PET (VM-1011, manufactured by Toyo Metallizing) was employed as (II) gas barrier layer 103, formation of the composition, laminating and production of the paper container were carried out in the same manner as in Example 1. The results of adhesive strength measurements are shown in Table 1 below.

In this example, as in the case of Example 1, it was possible to form a paper container having gas barrier properties that had sufficient adhesive strength for practical applications without using any organic solvent.

COMPARATIVE EXAMPLE 1

A laminate consisting of the layers from (I) paper layer 101 through (II) gas barrier layer 103 was produced in the same manner as in Example 1. Next, LDPE (a2) was employed in place of the composition for (III) epoxy-group-containing resin composition layer 104. Extrusion laminating was then carried out while performing an AC treatment in-line to the polyester layer 1 of (II) gas barrier layer 103, to produce a laminate. Other than these exceptions, the paper container was produced in the same manner as in Example 1.

SEIKA DAIN 3600 A and B manufactured by (Dainichiseika Color &Chemicals Mfg, Co, LTD) was employed for the AC agent used here. The blending ratio was 3600 A/3600 B/ethyl acetate=3/2/25. The coating weight was 2 g/m² wet. Solid component comprised 7% of the solution, thus the amount of organic solvent employed was 1.86 g/m². The results of adhesive strength measurements are shown in Table 1 below.

Although sufficient adhesive strength was obtained in this comparative example, a large amount of organic solvent was used.

COMPARATIVE EXAMPLE 2

A laminate consisting of the layers from (I) paper layer 101 through (II) gas barrier layer 103 was produced in the same manner as in Example 1. Next, the laminate was formed using LDPE (a2) in place of the composition for (III) epoxy-group-containing resin composition layer 104. Other than this exception, the paper container was formed in the same manner as in Example 1. An AC treatment was not performed. The results of adhesive strength measurements are shown in Table 1 below.

Sufficient adhesive strength could not be obtained in this comparative example.

COMPARATIVE EXAMPLE 3

A laminate consisting of the layers from (I) paper layer 101 through (II) gas barrier layer 103 was produced in the same manner as in Example 1. Next, the laminate was formed using a resin composition for (III) epoxy-group-containing resin composition layer 104 in which the weight ratio of LDPE (a1), which is employed as polyolefin (a) and ethylene-maleic anhydride copolymer (c1), which is employed as olefin polymer(c) having a functional group, was 85/15. The aforementioned was employed without adding epoxy-compound (b). The results of adhesive strength measurements are shown in Table 1 below.

The obtained laminate had a lower adhesive strength as compared to the case where epoxy-compound (b) was added.

TABLE 1

| | (I) | (IV) | (II) | (III) (A) | (B) | (C) | (*) g/15 mm | Amount of organic solvent used g/m² |
|---|---|---|---|---|---|---|---|---|
| Ex. 1 | high quality paper | a1 | Al vapor deposited PET | a2 100 parts | b1 0.9 parts | — | >450 | 0 |
| Ex. 2 | high quality paper | c2 | silica vapor deposited PET | a2 100 parts | b1 0.1 parts | — | >400 | 0 |
| Ex. 3 | paper board | a1 | Al vapor deposited PET | a2 100 parts | b1 0.9 parts | — | >470 | 0 |
| Ex. 4 | high quality paper | a1 | Al vapor deposited PET | a2 100 parts | b2 0.9 parts | — | >430 | 0 |
| Ex. 5 | high quality paper | a1 | Al vapor deposited PET | a1 85 parts | b1 0.8 parts | c1 15 parts | >520 | 0 |
| Ex. 6 | high quality paper | c1 | oxidized Al vapor deposited PET | a2 100 parts | b1 0.9 parts | — | >430 | 0 |
| Comp. Ex. 1 | high quality paper | a1 | Al vapor deposited PET | a2 | — | — | >480 | 1.86 |
| Comp. Ex. 2 | high quality paper | a1 | Al vapor deposited PET | a2 | — | — | 130 | 0 |
| Comp. Ex. 3 | high quality paper | a1 | Al vapor deposited PET | a1 85 parts | — | c1 15 parts | 180 | 0 |

Where:
(I) paper layer
(IV) synthetic resin layer
(II) gas barrier layer
(III) epoxy-group-containing resin composition layer
(*) adhesive strength between (II) gas barrier layer/(III) epoxy-group-containing resin composition layer

EXAMPLES 7~11, COMPARATIVE EXAMPLES 4~6

(1) Components of Resin Composition

The same materials as employed in Examples 1~6 and Comparative Examples 1~3 were used for the components of the resin composition in the Examples and Comparative Examples which follow.

(2) Production of Laminate

Unless otherwise specified, the following method was employed to produce the laminate in the following Examples and Comparative Examples.

Resin composition pellets were laminated to various types of base materials using an extrusion laminating molding device (manufactured by Modern Machinery) having a φ90 mm diameter extruder. The distance from the T-die to the nip roller was 120 mm and the laminating speed was 100 m/minutes. A corona discharge treatment (manufactured by Pira) of a specific discharge density was carried out at the same time as needed.

(3) Measurement of Adhesive Strength

The adhesive strength of the laminate produced in the Examples and Comparative Examples below was measured in the following manner. The result of these measurements are shown in Table 2.

The obtained laminate was cut into 15 mm wide oblong strips in the direction of flow within the device, and was peeled at the boundary layer between the (V) impact-resistant resin layer 206 and the (VIi) inner surface heat sealing layer 207. Adhesive strength was designated based on the peeling strength in a 90° peeling test with 5 samples and a peeling speed of 300 mm/min. In the case where the layer tore as the (VIi) inner surface heat sealing layer 207 was pulled to peel it off from the (V) impact resistant resin layer 206, adhesive strength was designated based on the value of the highest point on the chart, and was expressed in Table 2 using the symbol ">".

(4) Formation of Paper Container

Using the laminate formed above, paper containers were produced as follows in the Examples and Comparative Examples below.

The obtained laminates were cut to specific dimensions, subjected to crazing, and formed into paper containers having a 1 liter internal capacity in a loading device. The sealing temperature was 400° C. at both the top and bottom portions of the container. Containers were produced at a rate of 300 per hour. The middle portion of the containers was cut open, and the condition of the seals at the top and bottom portions of the container was evaluated from the inside.

(5) Measurement of Dropping Strength

The dropping strength of the paper containers formed above was measured as follows in the Examples and Comparative Examples below.

The paper containers produced above were filled with 1 liter of tap water and sealed. The filled containers were then dropped from a height of 1 meter, with their bottom surfaces directed downward, onto a concrete floor. This dropping experiment was carried out repeatedly until the container broke. The number of times the container was dropped before it broke was designated as the dropping strength. The maximum number of times a container was dropped was 10 times.

EXAMPLE 7

A φ90 mm extruder manufactured by Modern Machinery and a single laminator with a T-die 1300 mm in width were employed to form a 400 g/m² paper board into a (I) paper layer 202, to serve as the base material. For (VIo) outer surface heat sealing layer 201, LDPE (a1) was extrusion laminated to a thickness of 15 μm at a resin temperature of 320° C. and a withdrawing speed of 100 m/min, while performing a corona discharge treatment in-line. The output and electrode width in the corona discharge treatment were 7 KW and 600 mm, respectively. As a result, a laminate consisting of (VIo) outer surface heal sealing layer 201 and (I) paper layer 202 was obtained.

Using this as the base material, and 7 μm thick Al foil as the sand base material for (II) gas barrier layer 204, an ethylene-methyl methacrylate copolymer (EMAA), in which MFR=4g/10 min and the acid content was 7 wt %, was extrusion sand laminated to a thickness of 15 μm for the (IV) synthetic resin layer 203. The resin temperature was 320° C. and the withdrawing speed was 100 m/min. As a result, a laminate consisting of the layers from (VIo) outer surface heat sealing layer 201 through (II) gas barrier layer 204 was obtained.

LDPE (a2) was employed for the polyolefin in the resin composition forming (III) epoxy-group-containing resin composition layer 205 and (VIi) inner surface heat sealing layer 207. A resin composition, in which 0.9 parts by weight epoxidized soybean oil (b1) had been added as the epoxidized compound to 100 parts by weight LDPE (a2), was kneaded in a φ30 mm biaxial extruder to produce pellets.

(II) Gas barrier layer 204 of the laminate obtained above was employed as the base material, and 12 μm thick biaxially oriented PET film corona discharge treated on both surfaces which forms (V) impact-resistant resin layer 206 was employed as the sand base material. The aforementioned pelleted resin composition was extrusion laminated to a thickness of 15 μm at a resin temperature of 325° C. and withdrawing speed of 100 m/min, to form (III) epoxy-group-containing resin composition layer 205. In this way, a laminate consisting of the layers from (VIo) outer surface heat sealing layer 201 through (V) impact-resistant resin layer 206 was obtained.

Next, a (VIi) inner surface heat sealing layer 207 was formed to this laminate by extrusion laminating the resin composition that was pelletted above to a thickness of 30 μm at a resin temperature of 325° C. and a removing temperature of 100 m/min. As a result, a laminate having the structure shown in FIG. 10 was obtained.

The obtained laminate was sliced according to specific conditions, subjected to crazing, and formed into the box-shaped paper container shown in FIG. 8 by a loading device. The results of adhesive strength measurements, an evaluation of the condition of the seal at the top and bottom portions of the paper container, and measurements of dropping strength are shown in Table 2.

In this example, it was possible to form a paper container having gas barrier properties that had sufficient adhesive strength and dropping strength for practical applications without using any organic solvent.

EXAMPLE 8

With the exception that 0.1 parts by weight of epoxidized soybean oil was employed as the (b) epoxidized compound in the resin composition forming (III) epoxy-group-containing resin composition 205 and (VIi) inner surface heat sealing layer 207, formation of the composition, laminating and production of the paper container were carried out in the same manner as in Example 7. The results of adhesive strength measurements, an evaluation of the condition of the seal at the top and bottom portions of the paper container, and measurements of dropping strength are shown in Table 2.

In this example, as in the case of Example 7, it was possible to form a paper container having gas barrier properties that had sufficient adhesive strength and dropping strength for practical applications without using any organic solvent.

EXAMPLE 9

Formation of the composition and laminating were carried out in the same manner as in Example 7, with the exception that a 30 μm thick LLDPE film was employed as the sand base material, and extrusion sand laminating to a thickness of 15 μm was carried out at a resin temperature of 320° C. and a withdrawing speed of 100 m/min when laminating (VIi) inner surface heat sealing layer 207. As a result, a laminate was obtained of a structure consisting of LDPE (IV)/(I) paper board/(IV) EMAA/(II) Al foil/(III) epoxy-group-containing resin composition/(V) PET film/(III) epoxy-group-containing resin composition/(VI) LLDPE. Using this employed laminate, a paper container for formed in the same manner as in Example 7. The results of adhesive strength measurements, an evaluation of the condition of the seal at the top and bottom portions of the paper container, and measurements of dropping strength are shown in Table 2.

In this example, as in the case of Example 7, it was possible to form a paper container having gas barrier properties that had sufficient adhesive strength and dropping strength for practical applications without using any organic solvent.

EXAMPLE 10

With the exception that epoxidized linseed oil (b2) was employed as the (b) epoxidized compound in the resin composition forming (III) epoxy-group-containing resin composition 205 and (VIi) inner surface heat sealing layer 207, formation of the composition, laminating and production of the paper container were carried out in the same manner as in Example 7. The results of adhesive strength measurements, an evaluation of the condition of the seal at the top and bottom portions of the paper container, and measurements of dropping strength are shown in Table 2.

In this example, as in the case of Example 7, it was possible to form a paper container having gas barrier properties that had sufficient adhesive strength and dropping strength for practical applications without using any organic solvent.

EXAMPLE 11

A composition was employed for the composition forming (III) epoxy-group-containing resin composition layer 205 and (VIi) inner surface heat sealing layer 207, which was obtained by adding 0.8 parts by weight of an epoxidized soybean oil (b1) to 100 parts by weight of a composition in which LDPE (a1) was employed for the (a) polyolefin, ethylene-maleic anhydride copolymer (c1) was employed as the (c) olefin composition having a functional group that can react with epoxy group, and the weight ratio of LDPE (a1) and ethylene-maleic anhydride copolymer (c1) was 60/40, followed by melting and kneading of the mixture. With this exception, laminating and formation of the paper container were carried out in the same manner as in Example 1. The results of adhesive strength measurements, an evaluation of the condition of the seal at the top and bottom portions of the paper container, and dropping strength are shown in Table 2 below.

In this example, as in the case of Example 1, it was possible to form a paper container having gas barrier properties that had sufficient adhesive strength and dropping strength for practical applications without using any organic solvent.

Moreover, by adding a (c) polyolefin polymer having a functional group that can react with epoxy group, it is possible to still further improve the adhesiveness of (VIi) inner surface heat sealing layer 207 to (V) impact-resistant resin layer 206.

EXAMPLE 12

LDPE (a2) was employed for polyolefin (a) in the resin composition forming (VIo) outer surface heat sealing layer 201, (IV) synthetic resin layer 203, (III) epoxy-group-containing resin composition layer 205, and (VIi) inner surface heat sealing layer 207, and epoxidized soybean oil (b1) was employed for epoxidized compound (b). A resin composition in which 0.9 parts by weight of epoxidized soybean oil (b1) was added to 100 parts by weight of LDPE (a2) was kneaded using a φ30 mm biaxial extruder, to form pellets.

A φ115 mm extruder manufactured by Modern Machinery and a tandem laminator with a T-die 1500 mm in width were employed. At the first extruder, one surface of a 400 g/m² paper board forming paper layer 202 was employed as the base material, and a corona discharge treatment was performed in-line at an output of 6 KW and an electrode width of 1500 mm. 7 μm thick Al foil that forms (II) gas barrier layer 204 was employed as the sand base material. The aforementioned resin composition that forms (IV) synthetic resin layer 203 was subjected to extrusion sand laminating to a thickness of 15 μm at a resin temperature of 320° C. and a withdrawing speed of 100 m/min. The other surface of (I) paper layer 202 was employed as a base material at the second extruder. The aforementioned resin composition that forms (VIo) outer surface heat sealing layer 201 was extrusion laminated-to a thickness of 15 μm at a resin temperature of 320° C. and a withdrawing speed of 100 m/min. In this manner, a laminate consisting of the layers (VIo) outer surface heat sealing layer 201 through (II) gas barrier layer 204 was obtained.

Using the same tandem laminator, at the first extruder, (II) gas barrier layer 204 of the obtained laminate obtained was employed as the base material, and 12 μm thick biaxially oriented PET film corona discharge treated on both surfaces that forms (V) impact-resistant resin layer 206 was employed as the sand base material. The resin composition forming (III) epoxy-group-containing resin composition layer 205 was extrusion laminated to a thickness of 15 μm at a resin temperature of 325° C. and a withdrawing speed of 100 m/min. At the second extruder, (V) impact-resistant resin layer 206 was employed as the base material, and the resin composition forming (VIi) inner surface heat sealing layer 207 was extrusion laminated to a thickness of 15 μm at a resin temperature of 325° C. and a withdrawing speed of 100 m/min. As a result, a laminate having the structure shown in FIG. 10 was obtained.

The obtained laminate was formed into a paper container in the same manner as in Example 7. The results of adhesive strength measurements, an evaluation of the condition of the seal at the top and bottom portions of the paper container, and measurements of dropping strength are shown in Table 2.

In this example, it was possible to form a paper container with gas barrier properties that had sufficient adhesive strength and dropping strength for practical applications without using any organic solvent.

COMPARATIVE EXAMPLE 4

A laminate consisting of the layers from (VIo) outer surface heat sealing layer 201 through (II) gas barrier layer 204 was formed in the same manner as in Example 7. Next, this laminate was employed as the sand base material, and 12 μm thick biaxially oriented PET film corona discharge treated on both surfaces that forms (V) impact-resistant resin layer 206 was employed as the base material. LDPE (a1) was employed for (III) epoxy-group-containing resin composition layer 205. The LDPE was extrusion laminated to a thickness of 15 μm at a resin temperature of 325° C. and a withdrawing speed of 100 m/min, while performing an AC treatment in-line to the surface of the biaxially oriented PET film. As a result, a laminate consisting of the layers from (VIo) outer surface heat sealing layer 201 through (V) impact-resistant resin layer 206 was obtained.

LDPE (a2) was employed as the resin composition forming (VIi) inner surface heat sealing layer 207. This LDPE was extrusion laminated to a thickness of 30 μm at a resin temperature of 325° C. and a withdrawing speed of 100 m/min, while performing an AC treatment in-line to the laminate's (V) impact-resistant resin layer 206, i.e., the surface of the biaxially oriented PET film. As a result, a laminate having the structure shown in FIG. 10 was obtained.

This laminate was placed in an aging room and aged for 2 days at 40° C. to cure the AC agent.

SEIKA DAIN 3600 A and B manufactured by (Dainichiseika Color &Chemicals Mfg, Co, LTD) were used as the AC agents employed when laminating (III) epoxy-group-containing resin composition layer 205 and (VIi) inner surface heat sealing layer 207. The blending ratio was 3600 A/3600 B/ethyl acetate=3/2/25. The coating weight was 2 g/m² wet. The solid component of this solution was 7%. Thus, the amount of organic solvent was 1.9 g/m² each, for a total of 3.8 g/m².

Using the obtained laminate, a paper container was formed in the same manner as in Example 7. The results of adhesive strength measurements, an evaluation of the condition of the seal at the top and bottom portions of the paper container, and measurements of dropping strength are shown in Table 2.

Although sufficient adhesive strength could be obtained in this comparative example, a large amount of organic solvent was used.

COMPARATIVE EXAMPLE 5

7 μm thick Al foil that forms (II) gas barrier layer 204 and 12 μm thick biaxially oriented PET film corona discharge treated on both surfaces that forms (V) impact-resistant resin layer 206 were laminated using a dry laminating method. The adhesive agent employed at this time was a composition consisting of a polyester primary agent/isocyanate curing agent/ethyl acetate in a ratio of 100/7/70. A gravure roller was employed to coat this composition. The amount coated was 12 g/m². The solid component was 30%, thus the amount of organic solvent employed was 8.4 g/m². The drying temperature was 80° C., the application roller temperature was 60° C., the pasting speed was 40 m/min, and aging was performed at 60° C. for 2 days.

In a separate process, a laminate of (VIo) outer surface heat sealing layer 201 and (I) paper layer 202 was obtained in the same manner as in Example 7. This laminate was employed as the base material and a dry lamination product of (II) gas barrier layer 204 and (V) impact-resistant resin layer 206 was employed as the sand base material. For synthetic resin layer 203, EMAA with an acid content of 7 wt % and MFR=4 g/min was extrusion sand laminated to a thickness of 15 μm at a resin temperature of 320° C. and a withdrawing speed of 100 m/min. In this manner a laminate consisting of the layers from outer surface heat sealing layer 201 through impact-resistant resin layer 206 was obtained.

LDPE (a2) was employed for the resin composition forming (VIi) inner surface heat sealing layer 207. This LDPE was extrusion laminated to a thickness of 30 μm at a resin temperature of 325° C. and a withdrawing speed of 100 m/min, while performing an AC treatment in-line to the laminate's impact-resistant resin layer 206, i.e., to the surface of the biaxially oriented PET film. As a result, a laminate was obtained having the structure consisting of (VIo) outer surface heat sealing layer 201/(I) paper layer 202/(IV) synthetic resin layer 203/(II) gas barrier layer 204/(V) impact-resistant resin layer 206/(VIi) inner surface heat sealing layer 207.

This laminate was aged for 2 days at 40° C. in an aging room to cure the AC agent.

The AC agent employed when laminating (VIi) inner surface heat sealing layer 207 was the same as that employed in Comparative Example 4. The amount coated was 2 g/m² wet. Accordingly, the amount of organic solvent employed 1.9 g/m², with the amount of organic solvent employed in the laminate being 10 g/m².

The obtained laminate was employed in the same manner as in Example 7 to form a paper container. The results of adhesive strength measurements, an evaluation of the condition of the seal at the top and bottom portions of the paper container, and measurements of dropping strength are shown in Table 2.

Although sufficient adhesive strength could be obtained in this comparative example, a large amount of organic solvent was used.

COMPARATIVE EXAMPLE 6

As in the case of Example 7, a laminate consisting of the layers from (VIo) outer surface heat sealing layer 201 through (II) gas barrier layer 204 was formed. The laminate was produced and the paper container was formed in the same manner as in Example 7, with the exception that the composition comprising (III) epoxy-group-containing resin composition layer 205 and (VIi) inner surface heat sealing layer 207 was one in which the weight ratio between LDPE (a1), employed for the polyolefin (a), and ethylene-maleic anhydride copolymer (c1), employed for the olefin polymer (c) having functional groups, was 85/15, and a (b) epoxidized compound was not added. The results of adhesive strength measurements, an evaluation of the seal condition at the top and bottom portions of the container, and dropping strength measurements are shown in Table 2 below.

The obtained laminate had a lower adhesive strength and the seal quality at the top and bottom portions of the container was poor as compared to the case where epoxy-compound (b) had been added.

TABLE 2

| | (**) g/15 mm | amount of organic solvent used g/m² | seal condition at top portion of paper container | seal condition at bottom portion of paper container | Number of times dropped |
|---|---|---|---|---|---|
| Ex. 7 | >430 | 0 | excellent | excellent | >10 |
| Ex. 8 | >400 | 0 | excellent | excellent | >10 |
| Ex. 9 | 850 | 0 | excellent | excellent | >10 |
| Ex. 10 | >450 | 0 | excellent | excellent | >10 |
| Ex. 11 | >520 | 0 | excellent | excellent | >10 |
| Ex. 12 | >420 | 0 | excellent | excellent | >10 |

TABLE 2-continued

| | (**) g/15 mm | amount of organic solvent used g/m² | seal condition at top portion of paper container | seal condition at bottom portion of paper container | Number of times dropped |
|---|---|---|---|---|---|
| Comp. Ex. 4 | >480 | 3.8 | excellent | excellent | >10 |
| Comp. Ex. 5 | >500 | 10.3 | excellent | excellent | >10 |
| Comp. Ex. 6 | 150 | 0 | partially separation | Occurrence of peeling over surface | 1 |

Where,
(**) = adhesive strength between (V) impact resistant resin layer/(VIi) inner surface heat sealing layer

EXAMPLE 13

A SORBEX-II ozone generating device manufactured by (SOFTAL) NIHON was employed when extrusion laminating the composition of (III) epoxy-group-containing resin composition layer 104. The molding speed was 300 m/min. An ozone treatment was performed to the melted surface on the (II) layer side of the melted resin film that forms the (III) layer. The ozone concentration was 45 g/m³ and the ozone flow was 3 m³/hr. Other than the preceding, the formation of the composition and production of the laminate were carried out in the same manner as in Example 1.

The adhesive strength between the (II) gas barrier layer and the (III) epoxy group containing resin composition layer was measured in the same manner as in Example 1. Peeling was carried out at the boundary between the (II) gas barrier layer and the (III) epoxy-group-containing resin composition layer. The degree of oxidation was measured on the ozone treated surface in accordance with the measuring method described above. An evaluation of the laminate's odor was also performed. These results are shown in Table 3. The case where no odor could be detected is indicated by the symbol "O".

A laminate having gas barrier properties with adhesive strength sufficient to permit practical use could be obtained without using an organic solvent. Moreover, by carrying out an ozone treatment and increasing the degree of oxidation, it was possible to significantly increase the molding speed.

EXAMPLE 14

Formation of the composition and production of the laminate was carried out in the same manner as in Example 13, with the exception that the molding speed for the (III) epoxy-group-containing resin composition layer 104 was 100 m/min, the molding temperature was 200° C., the ozone flow rate was 6 m³/hr, and the (III) layer thickness was 40 μm. Evaluations were carried out in the same manner as in Example 13, with these results shown in Table 3.

A laminate having gas barrier properties with adhesive strength sufficient to permit practical use could be obtained without using an organic solvent. Moreover, by carrying out an ozone treatment and increasing the degree of oxidation, it was possible to carry out molding at a lower temperature.

COMPARATIVE EXAMPLE 7

The laminate was formed in the same manner as in Example 13, with the exception that the ozone treatment was not performed. Evaluations were carried out in the same manner as in Example 13, with these results shown in Table 3. Adhesive strength was not sufficient in this example. This is believed to be due to a molding speed that was too fast.

COMPARATIVE EXAMPLE 8

The laminate was formed in the same manner as in Example 14, with the exception that the ozone treatment was not performed. Evaluations were carried out in the same manner as in Example 14, with these results shown in Table 3. Adhesive strength was not sufficient in this example. This is believed to be due to a molding temperature that was too low.

COMPARATIVE EXAMPLE 9

A SORBEX-II ozone generating device manufactured by (SOFTAL) NIHON was employed when extrusion laminating LDPE (a2). The molding speed was 300 m/min. An ozone treatment was performed to the melted surface on the (II) gas barrier side of the LDPE layer. The ozone concentration was 45 g/m³ and the ozone flow was 3 m³/hr. With the exception of the preceding, an attempt was made to form the composition and produce the laminate in the same manner as in Comparative Example 1. However, scattering of the AC agent occurred during high speed operation, so that a stable molding was not possible.

TABLE 3

| | (III) layer molding speed (m/min) | (III) layer molding temperature (° C.) | amount of organic solvent used (g/m²) | ozone treatment | (II)/(III) adhesive strength between layers (g/15 mm) | odor | degree of oxidation |
|---|---|---|---|---|---|---|---|
| Ex. 13 | 300 | 320 | 0 | 45 g/m³ 3 m³/hr | >400 | O | 0.16 |
| Ex. 14 | 100 | 200 | 0 | 45 g/m³ 6 m³/hr | >380 | O | 0.12 |

TABLE 3-continued

|  | (III) layer molding speed (m/min) | (III) layer molding temperature (° C.) | amount of organic solvent used (g/m²) | ozone treatment | (II)/(III) adhesive strength between layers (g/15 mm) | odor | degree of oxidation |
|---|---|---|---|---|---|---|---|
| Comp. Ex. 7 | 300 | 320 | 0 | — | 40 | ○ | 0.04 |
| Comp. Ex. 8 | 100 | 200 | 0 | — | 30 | ○ | 0.03 |
| Comp. Ex. 9 | (300) molding not possible | 320 | — | 45 g/m³ 3 m³/hr | — | — | — |

Industrial Field of Application

The present invention makes it possible to obtain a laminate and paper container with gas barrier properties, that has an excellent heat sealing capacity and is superior with respect to its gas barrier and odor retaining properties.

Even without employing adhesive agent, an excellent degree of adhesion can be obtained between each layer of the laminate forming the present invention's paper container with gas barrier properties. Further, it is not necessary to provide time to cure (aging time) an adhesive agent during the production process. Thus, productivity can be improved. Moreover, since the laminate can be formed without employing an organic solvent, this has a desirable effect upon the work environment and reduces production costs. Moreover, no odor from an organic solvent remains in the final product. By employing the present invention's epoxy-group-containing resin composition, it is possible to carry out low temperature or high speed molding, providing for higher productivity.

The present invention's paper container has a long life cycle, and is superior with respect to heat seal strength, dropping strength, and impact-resistance. This paper container is suitable for packaging liquids, or dry food products or medicines.

What is claimed:

1. A paper container with gas barrier properties comprising a (1) paper layer, a (II) gas barrier layer, and an (III) epoxy-group-containing resin composition layer, said (III) epoxy-group-containing resin composition layer comprising a polyolefin (a) with a melt flow rate of 0.1~100 g/10 min and an epoxy-compound (b) comprising two or more epoxy groups in the molecule and a molecular weight of 3,000 or less, and said epoxy-compound (b) present in an amount of 0.01~5 parts by weight with respect to 100 parts by weight of said polyolefin (a);

said (II) gas barrier layer comprising a surface which was not treated with an anchor coat agent;

said (III) epoxy-group-containing resin composition layer comprising a treated surface with a degree of oxidation in the range of 0.05 to 1.0;

said (III) epoxy-group-containing resin composition layer is laminated onto said (II) gas barrier layer so that said treated surface of said (III) epoxy-group-containing resin composition layer is laminated onto said surface which was not treated with an anchor coat agent of said (II) gas barrier layer; and said (I) paper layer is disposed further to the outside of the container than said (II) gas barrier layer and said (III) epoxy-group-containing resin composition layer.

2. A paper container with gas barrier properties according to claim 1, said paper container comprising a structure in which said (I) paper layer, at least one of a (IV) synthetic resin layer and said (III) epoxy-group-containing resin composition layer, said (II) gas barrier layer, and at least one of a (IV) synthetic resin layer and said (III) epoxy-group-containing resin composition layer are laminated in order from the outside of the container.

3. A paper container with gas barrier properties according to claim 1, wherein said paper container further comprises a (V) impact-resistance resin layer, and said (V) impact-resistance resin layer is disposed onto said (III) epoxy-group-containing resin composition layer.

4. A paper container with gas barrier properties according to claim 1, wherein said paper container comprises a (VI) heat sealing layer as its outermost and/or innermost layer.

5. A paper container with a gas barrier properties comprising a (1) paper layer, a (II) gas barrier layer, and an (III) epoxy-group-containing resin composition layer, said (III) epoxy-group-containing resin composition layer comprising a polyolefin (a) with a melt flow rate of 0.1~100 g/10 min and an epoxy-compound (b) comprising two or more epoxy groups in the molecule and a molecular weight of 3,000 or less, and said epoxy-compound (b) present in an amount of 0.01~5 parts by weight with respect to 100 parts by weight of said polyolefin (a), said (II) gas barrier layer is disposed onto said epoxy-group-containing resin composition layer; said (I) paper layer is disposed further to the outside of the container than said (II) gas barrier layer and said (III) epoxy-group-containing resin composition layer;

said paper container comprises further a (V) impact-resistance resin layer and a (IV) heat sealing layer as its innermost layer, and said (V) impact-resistant resin layer is laminated onto said (III) epoxy-group-containing resin composition layer, and said (VI) heat sealing layer is laminated onto said impact-resistant resin layer.

* * * * *